(12) United States Patent
Lillard et al.

(10) Patent No.: US 9,848,082 B1
(45) Date of Patent: Dec. 19, 2017

(54) AGENT ASSISTING SYSTEM FOR PROCESSING CUSTOMER ENQUIRIES IN A CONTACT CENTER

(71) Applicant: Noble Systems Corporation, Atlanta, GA (US)

(72) Inventors: Brian T. Lillard, Canton, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 0 days.

(21) Appl. No.: 15/082,301

(22) Filed: Mar. 28, 2016

(51) Int. Cl.
| | | |
|---|---|---|
| H04M 3/51 | (2006.01) | |
| H04W 4/14 | (2009.01) | |
| G10L 15/08 | (2006.01) | |
| H04M 3/493 | (2006.01) | |
| G10L 15/26 | (2006.01) | |

(52) U.S. Cl.
CPC ......... H04M 3/5141 (2013.01); G10L 15/083 (2013.01); G10L 15/26 (2013.01); H04M 3/493 (2013.01); H04M 3/51 (2013.01); H04W 4/14 (2013.01)

(58) Field of Classification Search
CPC .......... H04M 3/51; H04M 3/493; G10L 15/26
See application file for complete search history.

(56) References Cited

U.S. PATENT DOCUMENTS

| | | |
|---|---|---|
| 5,850,433 A | 12/1998 | Rondeau |
| 6,198,814 B1 | 3/2001 | Gill |
| 6,356,634 B1 | 3/2002 | Noble, Jr. |
| 6,370,574 B1 | 4/2002 | House et al. |
| 6,621,900 B1 | 9/2003 | Rice |
| 6,694,298 B1 | 2/2004 | Teagarden et al. |
| 6,724,887 B1 | 4/2004 | Eilbacher et al. |
| 6,810,260 B1 | 10/2004 | Morales |
| 6,959,080 B2 | 10/2005 | Dezonno et al. |
| 6,988,205 B2 | 1/2006 | Walker et al. |
| 7,076,427 B2 | 7/2006 | Scarano et al. |
| 7,085,719 B1 | 8/2006 | Shambaugh et al. |
| 7,133,828 B2 | 11/2006 | Scarano et al. |

(Continued)

OTHER PUBLICATIONS

Noble Systems Corporation, Maestro 2010.1.1 User Manual, vol. 2, Aug. 3, 2010, 416 pages, Noble Systems Corporation, Atlanta GA 30319.

(Continued)

*Primary Examiner* — Lisa Hashem

(57) ABSTRACT

A system is disclosed that assists contact center agents with servicing customer enquiries. A wireless caller with an enquiry calls a contact center and is prompted to leave a voice message and accept a text callback as a response. The voice message is processed by a speech analytics system that extracts certain keywords in the voice message and develops a transcript as well. Upon selecting an available agent to provide the response, the keywords and transcript are presented to the agent along with a draft text response, formulated by the system using the identified keywords. Additional resources may be provided as necessary to the agent, who can also review the original audio recording. Upon reviewing and potentially editing the text response, the agent causes the text to be sent to the wireless caller, which may be sent as an SMS text, or in some other form.

18 Claims, 12 Drawing Sheets

(56) References Cited

U.S. PATENT DOCUMENTS

| | | |
|---|---|---|
| 7,227,930 B1 | 6/2007 | Othmer et al. |
| 7,457,404 B1 | 11/2008 | Hession et al. |
| 7,542,902 B2 | 6/2009 | Scahill et al. |
| 7,548,539 B2 | 6/2009 | Kouretas et al. |
| 7,561,677 B2 | 7/2009 | Flynt et al. |
| 7,574,000 B2 | 8/2009 | Blair |
| 7,599,475 B2 | 10/2009 | Eilam et al. |
| 7,672,845 B2 | 3/2010 | Beranek et al. |
| 7,752,043 B2 | 7/2010 | Watson |
| 7,783,290 B2 | 8/2010 | Kim |
| 7,860,722 B1 | 12/2010 | Chow |
| 7,916,846 B1 | 3/2011 | Farah |
| 7,930,179 B1 | 4/2011 | Gorin et al. |
| 8,059,790 B1 | 11/2011 | Paterik et al. |
| 8,077,832 B2 | 12/2011 | Othmer et al. |
| 8,078,470 B2 | 12/2011 | Levanon |
| 8,094,790 B2 | 1/2012 | Conway et al. |
| 8,094,803 B2 | 1/2012 | Danson et al. |
| 8,103,722 B2 | 1/2012 | Lee |
| 8,107,613 B2 * | 1/2012 | Gumbula .......... H04M 3/42221 |
| | | 379/265.11 |
| 8,136,026 B2 | 3/2012 | Commarford et al. |
| 8,175,007 B2 | 5/2012 | Jain et al. |
| 8,180,643 B1 | 5/2012 | Pettay et al. |
| 8,209,182 B2 | 6/2012 | Narayanan |
| 8,219,401 B1 | 7/2012 | Pettay et al. |
| 8,249,875 B2 | 8/2012 | Levanon et al. |
| 8,279,779 B2 | 10/2012 | Singh et al. |
| 8,280,031 B2 | 10/2012 | Segall et al. |
| 8,315,374 B2 | 11/2012 | Perlmutter |
| 8,326,643 B1 | 12/2012 | Eshkenazi et al. |
| 8,358,771 B1 | 1/2013 | Moore et al. |
| 8,374,915 B2 | 2/2013 | Hayes, Jr. et al. |
| 8,396,205 B1 | 3/2013 | Lowry et al. |
| 8,401,155 B1 | 3/2013 | Barnes et al. |
| 8,401,163 B1 * | 3/2013 | Kirchhoff .......... H04L 29/06197 |
| | | 370/356 |
| 8,403,222 B2 | 3/2013 | Kindberg et al. |
| 8,422,641 B2 | 4/2013 | Martin, II |
| 8,462,918 B2 * | 6/2013 | Segall et al. ...... H04M 3/42382 |
| | | 379/88.19 |
| 8,477,915 B1 | 7/2013 | Vasquez et al. |
| 8,537,983 B1 | 9/2013 | Haggerty et al. |
| 8,606,245 B1 | 12/2013 | Eccelston et al. |
| 8,666,822 B1 | 3/2014 | Kaliss |
| 8,712,032 B1 | 4/2014 | Leary, II et al. |
| 9,014,364 B1 | 4/2015 | Koster et al. |
| 9,058,366 B2 * | 6/2015 | Brezina ................ H04M 15/00 |
| 9,064,025 B2 * | 6/2015 | Jones ................ G06F 17/30899 |
| 9,160,852 B2 | 10/2015 | Ripa et al. |
| 9,386,154 B2 * | 7/2016 | Baciu .................. H04M 3/5191 |
| 9,667,789 B2 * | 5/2017 | Odinak et al. ...... H04M 3/5183 |
| 2002/0164006 A1 | 11/2002 | Weiss |
| 2002/0176405 A1 | 11/2002 | Aijala |
| 2002/0194002 A1 | 12/2002 | Petrushin |
| 2003/0002651 A1 | 1/2003 | Shires |
| 2003/0032409 A1 | 2/2003 | Hutcheson et al. |
| 2003/0231750 A1 | 12/2003 | Janveja et al. |
| 2004/0008828 A1 | 1/2004 | Coles et al. |
| 2004/0028213 A1 | 2/2004 | Goss |
| 2004/0042611 A1 | 3/2004 | Power et al. |
| 2004/0052342 A1 * | 3/2004 | Jugovec ................ H04M 3/493 |
| | | 379/88.22 |
| 2004/0170258 A1 | 9/2004 | Levin et al. |
| 2004/0179672 A1 | 9/2004 | Pagel et al. |
| 2005/0048967 A1 | 3/2005 | Hoglander et al. |
| 2005/0069102 A1 * | 3/2005 | Chang ................ H04M 3/493 |
| | | 379/88.18 |
| 2005/0149399 A1 | 7/2005 | Fukunaga et al. |
| 2005/0201534 A1 * | 9/2005 | Ignatin ................ H04M 1/663 |
| | | 379/88.22 |
| 2005/0226395 A1 | 10/2005 | Benco et al. |
| 2005/0232410 A1 | 10/2005 | Gonzalez |
| 2005/0265322 A1 | 12/2005 | Hester |
| 2006/0023867 A1 * | 2/2006 | Saleh .................. H04M 3/5183 |
| | | 379/265.09 |
| 2006/0036487 A1 | 2/2006 | Mann |
| 2006/0159241 A1 | 7/2006 | Jagdish et al. |
| 2006/0233347 A1 | 10/2006 | Tong et al. |
| 2006/0256957 A1 | 11/2006 | Fain et al. |
| 2006/0265090 A1 | 11/2006 | Conway et al. |
| 2007/0015553 A1 | 1/2007 | Siddiqui |
| 2007/0041527 A1 * | 2/2007 | Tuchman ........... G06Q 30/0207 |
| | | 379/88.22 |
| 2007/0094073 A1 | 4/2007 | Dhawan et al. |
| 2007/0121824 A1 | 5/2007 | Agapi et al. |
| 2007/0201646 A1 | 8/2007 | Metcalf |
| 2007/0208570 A1 * | 9/2007 | Bhardwaj ................ H04M 3/51 |
| | | 704/270.1 |
| 2008/0142599 A1 | 6/2008 | Benillouche et al. |
| 2008/0240376 A1 | 10/2008 | Conway et al. |
| 2008/0270279 A1 | 10/2008 | Rowe |
| 2009/0003316 A1 | 1/2009 | Lee et al. |
| 2009/0029725 A1 | 1/2009 | Gerard Kindberg |
| 2009/0082044 A1 | 3/2009 | Okuyama et al. |
| 2010/0075634 A1 | 3/2010 | Miller |
| 2010/0104086 A1 | 4/2010 | Park |
| 2010/0128862 A1 | 5/2010 | Vendrow |
| 2010/0138411 A1 | 6/2010 | Judy et al. |
| 2010/0332276 A1 | 12/2010 | Gates et al. |
| 2011/0010173 A1 | 1/2011 | Scott et al. |
| 2011/0029380 A1 | 2/2011 | Moukas et al. |
| 2011/0033036 A1 | 2/2011 | Edwards et al. |
| 2011/0125499 A1 | 5/2011 | Griggs et al. |
| 2011/0153398 A1 | 6/2011 | Tjhai et al. |
| 2011/0165858 A1 | 7/2011 | Gisby et al. |
| 2011/0173040 A1 | 7/2011 | Curtis et al. |
| 2011/0182283 A1 | 7/2011 | Van Buren et al. |
| 2011/0208522 A1 | 8/2011 | Pereg et al. |
| 2011/0208578 A1 | 8/2011 | Bergh et al. |
| 2011/0222679 A1 | 9/2011 | Tal et al. |
| 2011/0258156 A1 | 10/2011 | Fitzpatrick et al. |
| 2011/0287748 A1 | 11/2011 | Angel et al. |
| 2011/0307258 A1 | 12/2011 | Liberman et al. |
| 2012/0088475 A1 | 4/2012 | Portman et al. |
| 2012/0124227 A1 | 5/2012 | Al-Khowaiter et al. |
| 2012/0128267 A1 | 5/2012 | Dugan et al. |
| 2012/0224020 A1 | 9/2012 | Portman et al. |
| 2012/0261465 A1 | 10/2012 | Vasquez et al. |
| 2012/0296642 A1 | 11/2012 | Shammass et al. |
| 2013/0039483 A1 | 2/2013 | Wolfeld et al. |
| 2013/0065558 A1 | 3/2013 | Oneil et al. |
| 2013/0143539 A1 | 6/2013 | Baccy et al. |
| 2013/0202101 A1 | 8/2013 | LaBoyteaux et al. |
| 2013/0246053 A1 | 9/2013 | Scott et al. |
| 2013/0282844 A1 * | 10/2013 | Logan et al. .......... H04L 67/02 |
| | | 709/206 |
| 2013/0301482 A1 * | 11/2013 | Katis ................ H04L 29/06176 |
| | | 370/276 |
| 2013/0316677 A1 | 11/2013 | Aharon |
| 2014/0115486 A1 | 4/2014 | Benson et al. |
| 2014/0133643 A1 | 5/2014 | Claudatos et al. |
| 2014/0140496 A1 | 5/2014 | Ripa et al. |
| 2014/0140497 A1 | 5/2014 | Ripa et al. |
| 2014/0163960 A1 | 6/2014 | Dimitriadis et al. |
| 2014/0179260 A1 * | 6/2014 | Malin .................... H04W 4/22 |
| | | 455/404.2 |
| 2014/0181676 A1 | 6/2014 | Samborskyy et al. |
| 2014/0270110 A1 * | 9/2014 | Strunk .................... H04M 1/64 |
| | | 379/88.01 |
| 2015/0098561 A1 | 4/2015 | Etison et al. |
| 2015/0181025 A1 * | 6/2015 | McBride ........... H04M 3/42008 |
| | | 455/413 |
| 2016/0212266 A1 * | 7/2016 | Soundar .............. H04M 3/5235 |
| 2016/0370952 A1 * | 12/2016 | Karnewar ............. G06F 3/0482 |
| 2017/0201613 A1 * | 7/2017 | Engelke ............. H04M 1/7255 |

OTHER PUBLICATIONS

Noble Systems Corporation, Maestro 2010.1.1 User Manual, vol. 1, Aug. 17, 2010, 454 pages, Noble Systems Corporation, Atlanta, GA.

(56) References Cited

OTHER PUBLICATIONS

Noble Systems Corporation, Maestro 2010.1.1 Manual, vol. 3: Reports, Aug. 18, 2010, pp. 1-124, Noble Systems Corporation, Atlanta, GA.
Noble Systems Corporation, Maestro 2010.1.1 Manual, vol. 4: IVR, Oct. 27, 2010, pp. 1-318, Noble Systems Corporation, Atlanta, GA.
Noble Systems Corporation, Harmony Version 3.1 User Manual, May 9, 2013, 236 pages, Noble Systems corporation, Atlanta, GA.

* cited by examiner

US 9,848,082 B1

AGENT ASSISTING SYSTEM FOR PROCESSING CUSTOMER ENQUIRIES IN A CONTACT CENTER

FIELD OF THE DISCLOSURE

The concepts and technologies disclosed herein generally pertain to a system for assisting a contract center agent responding to a voice message left by a caller. In one embodiment, a caller may leave a voice message with the expectation that a subsequent SMS text message will be sent responding to the caller's enquiry.

BACKGROUND OF THE INVENTION

Contact centers are employed by various business entities and government agencies to provide customer service. Contact centers are typically one means for handling customer enquiries, orders, complaints, etc. Providing quick, efficient, and timely responses for such incoming requests is a common goal of the contact center. However, there is an inherent tension involved in accomplishing these goals. Reducing the waiting time of incoming calls in order to provide quick responses can be accomplished by hiring more agents to field these calls. However, hiring more agents to reduce the waiting time increases costs, and frequently results in various times during the day when agents may not be used in a productive manner because incoming call volumes have dropped off. Thus, efficiency may suffer. However, maximizing utilization of agents may result in callers waiting an unacceptable time period. Attempting to find an acceptable balance to the operational goals of the contact center and customer expectations can be difficult, and typically involves continually monitoring, measuring, and adjusting various operational parameters in the contact center.

Various technological mechanisms have been identified as potential solutions for "evening out" agent demand for handling calls in order to ensure agents are efficiently utilized. The goal is to allow a fixed number of agents to handle peaks and valleys of incoming call levels in an efficient manner. For example, one solution developed many years ago is to place callers into a queue, if agents are not available. Thus, the caller waits for an available agent. However, callers would then hang up, thereby abandoning the queue, if the caller is required to wait too long. In response, messages were provided to the caller indicating an expected wait time. Mechanisms were developed where callers could leave a message and receive a subsequent call back. Those skilled in the art will recognize that there are various routing, queuing, callback, and messaging mechanisms that attempt to address the basic problem of handling customer interactions in an efficient, timely, and cost effective manner.

Complicating the operational aspect of the contact center is that customers now have various mechanisms for contacting a business, and may have different preferences for how they originate the contact or how to be responded to their original contact. Customers may send a short message service ("SMS") text, send an instant message, initiate a request via a web page, use various forms of social media, initiate a phone call, or send an email as the initial form of communication. While the business entity may respond in a like form (e.g., using the same channel type), this may not always be the case.

Frequently, how communications occur with the customer, either initially or in response, may depend on the urgency and nature of the communication. For example, an urgent request from a customer may drive the customer to use one channel type over another. Frequently, for example, sending a SMS text is associated with a greater level of urgency than sending an email or a hardcopy letter. On the other hand, a complicated enquiry may not be easily conveyed in the limited capabilities associated with an SMS text, and may force the customer to use email or a phone call. However, though a question may be complicated, the answer may be relatively simple e.g., a simple yes or no, and the caller may find it acceptable to receive the answer conveyed in a different manner than the original request.

Providing a timely, efficient, and effective response by a contact center may be complicated in that a variety of options exist for how the response may be communicated. However, in some instances, the contact center may offer the customer various options for how the response is to be provided, and certain options may facilitate the contact center in providing a timely, efficient, and effective response. Therefore, mechanisms are required to allow a contact center flexibility in providing a timely, efficient, and effective response to a customer enquiry.

SUMMARY

Various embodiments of the present invention allow a contact center to respond to an enquiry in a deferred manner, and wherein the original enquiry that is received in a first form may be processed in a different form prior to providing a response, which may be either in the first form or in another form. In other embodiments, the enquiry may be in a voice form, where the caller leaves a voice message that is stored and subsequently processed. In one embodiment, the processing involves processing the audio of the voice message to develop a transcript of the voice message. In another embodiment, the processing involves processing the audio of the voice message to identify keywords spoken during the voice message. The transcript and/or the keywords may be presented to an agent when preparing a response. Further, the keywords may be used to generate a draft response and/or identify potential resources that may be useful to the agent in preparing the response. Finally, in other embodiments, the agent may edit or generate a response, which may be in various forms, such as a SMS text, instant message, recorded announcement, or a live voice call back to the caller.

As is discussed in greater detail below, the subject matter disclosed herein may be implemented in various forms, including a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
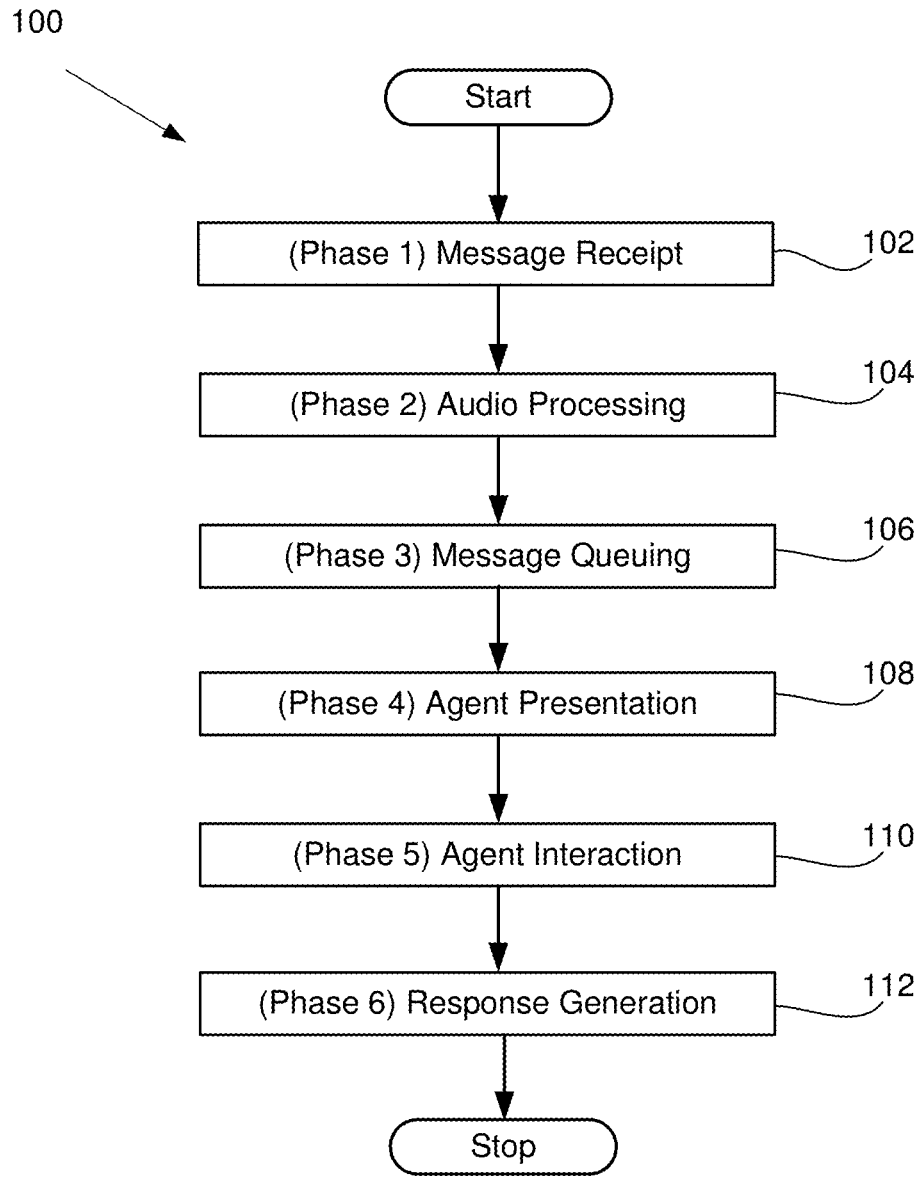
FIG. 1 illustrates one process flow of six phases associated with providing agent assistance for caller enquiries.

Providing effective, rapid, and efficient responses to a caller's enquiry can be difficult. Ensuring a rapid response to a caller's enquiry can be accomplished by having a large staff of agents, so that agents are available to handle a peak volume of calls. This ensures that whenever a call arrives, an agent is available to quickly answer and respond. However, it can be expected that the call volume will vary, and when the volume decreases, then many agents may be idle. Having idle agents does not support an efficient and low cost approach for responding to a caller's enquiry.

From the caller's perspective, providing an effective response to an enquiry may depend on the circumstances, which are known to the caller, but not to the contact center. For example, the degree of urgency is one factor as is the willingness to wait for an answer. In some instances, the caller may urgently require a response and is willing to wait in a queue in order to receive an answer. However, that does not mean the caller is happy to be waiting in a queue, or will not be frustrated by the experience. In other instances, the caller may not require the answer immediately, and is not willing to wait in a queue at the moment. Perhaps the caller may decide to call back later, if the wait time is shorter, in order to receive an answer to their enquiry. At some point, the urgency may increase and the caller is forced to wait in a queue in order to speak with an agent.

In addition, the complexity of the question, and the response, may vary. The caller may have an enquiry which is fairly simple to communicate. For example, "is the flight from Atlanta on time?" Or, "when is my order being shipped?" Of course, in order to answer these enquiries, an appropriate context must be obtained. For example, what city is the caller located in, so that the flight from Atlanta can be properly identified? Or, what is the caller's name, so that an account can be identified and their order identified. Typically, this information can be derived from the caller's name and/or calling telephone number.

In other cases, the caller's enquiry may be complicated. It may involve communicating a number of facts, assumptions, or related information necessary to properly frame the question. The caller is presumed to know this contextual information. Frequently, the caller is able to determine whether the enquiry can be communicated in a sentence or two, or requires an elaborate explanation. Thus, the caller frequently knows whether the enquiry could be left as a message that could be reviewed by a customer service representative for preparing a response, or whether the message is so complicated that it would have to be explained via a conversation with the agent.

The answer to the caller's enquiry may be simple or complex, and is not necessarily correlated to whether the enquiry is simple or complex. For example, a relative simple question may require a qualified and complicated response. Or, a complex question may be answered with a relative simply answer (e.g., yes or no).

Some of the solutions for allowing a caller to interact with an agent in a timely and effective manner are not able to accommodate the various combinations of simple/complex question and simple/complex answers. That is because the processes designed by the contact center typically do not know (before the call is made) the nature of the question/answer. Thus, the processed designed by the contact center typically presumes that the caller should be connected to an agent for a live conversation. In some cases, the caller may not be willing to wait in a queue, or if they are willing to wait, their experience is less than satisfactory.

Other approaches attempt to maximize the agent's utilization by routing the caller first to a self-service interactive voice response unit ("IVR"), but frequently these are not able to address the caller's enquiry, and merely are used to obtain the nature of the enquiry (e.g., a customer service enquiry, a billing enquiry, a return enquiry, etc.)

A process designed to maximize the agent's effectiveness and satisfy the caller's desire for a timely response must have flexibility designed therein to allow some decision making on part of the caller and the agent as to how best communicate and response to a caller enquiry.

Thus, as will be seen, the process herein, allows the caller, in one embodiment, to have input as to whether their enquiry can be addressed by leaving a voice message, or whether the enquiry requires a live conversation between the caller and the agent. Further, when the caller does leave a voice message, they may have discretion as to how the response should be communicated—e.g., via a voice callback, a recorded announcement callback, or a SMS text callback.

Further, in instances where the caller does leave a voice message, the agent may have discretion, in one embodiment, how to respond to the voice message, including responding with a recorded voice message, SMS text message, or whether a live voice call is required. For instances where the caller may require information, that can be addressed without an immediate live voice call with an agent, the system herein provides a cost effective, timely, and efficient approach for assisting an agent in responding to the enquiry.

The Six Phase Process

The process for assisting an agent in responding to a customer enquiry can be described as a six-phase process. The breakdown into six phases is largely for purposes of illustration, and some phases could be combined, expanded, or otherwise redefined. However, the various phases provided a useful way to describe various inventive concepts related to responding to customer enquiries. A high level overview of the six phases are shown in FIG. 1.

Phase 1—Message Receipt

Turning to FIG. 1, the process begins with Phase 1 that is the Message Receipt phase 102. The Message Receipt phase begins with the receipt of an incoming communication from the remote party, which may be in the form of a voice call from a remote party. In other embodiments, an incoming email or SMS text message could be received, although this may alter some of the processing functions. The remote party may be a customer, potential customer, work colleague, or some other type of individual seeking to have an enquiry addressed. Reference to the term "customer" is illustrative, and should not be viewed as limiting application of the principles disclosed herein.

The customer may originate the incoming communication by calling a toll-free number associated with a particular function, e.g., customer service enquiries, ordering line, etc. It is common for such calls to be received by an automatic call handling device ("ACD") or some other call handling device in the contact center, such as an interactive voice response unit ("IVR"). If an agent is immediately available, the caller may be routed to the agent. However, in many instances, the agent is not immediately available. The call may be nevertheless answered with the caller being placed in a hold queue and the caller may be provided with an announcement via an IVR while they are on hold (e.g., the ubiquitous music on hold). In some embodiments, the caller may be informed of the wait time before an agent is expected to be available. This information may be useful to the caller to evaluate whether to wait for an agent or leave a message for a subsequent response.

Once the call is answered by an IVR, various options may be presented to the caller, based on various conditions. Selection of an option may depend on the purpose of the caller's enquiry and the caller's urgency in receiving an answer. The caller may be informed of an option of receiving a voice callback in lieu of waiting in the queue. This involves ascertaining when and to what number the call back should be directed to. Once this is ascertained, the caller can be removed from the queue and disconnected. This essentially allows the agents to serve other callers, who chose to not receive a deferred response, and essentially reassigned the demand of that caller to another time period. This form of "load shifting" is one approach for achieving efficient agent utilization, but typically requires consent of the caller to ensure caller satisfaction.

However, merely arranging a callback, without the caller leaving a voice message, does not provide any information to the agent in formulating a response. While the caller may receive a scheduled callback, that merely results in another round of "phone tag." In other words, merely scheduling a callback by itself does not advance addressing the customer's enquiry. In order to advance the customer's enquiry, the customer may be prompted to leave a voicemail message regarding the nature of their enquiry.

The prompting of the customer may be triggered in various ways, as will be discussed further. The customer may be informed of the waiting time while on hold in the IVR and indicate a willingness to leave a message for a subsequent response. Or, the call handler may ascertain the wait time, and request the customer leave a voice message or at least provide the option for the caller to leave a message. There are various conditions that may trigger the caller to leave a message, some of which may only be known to the caller. The caller may interact with an IVR or other contact center equipment to indicate a desire to leave a voice message. The customer may also be asked, or may otherwise indicate, what form the subsequent response should be provided to the customer. That is, the caller may indicate or confirm whether the response may be provided via a SMS text, email, instant message, social media response, voice call, or written letter.

Once the caller leaves the voice message (which may be reviewed, recorded, and confirmed), the call may be terminated and processing may begin for providing the subsequent response. At this point, the processing of the Message Receipt phase 102 is completed.

Once the caller indicates that they are willing to leave a voice message, that caller's place in the queue may be relinquished, and this allows the agents to serve other callers in the queue. When the caller agrees to leave a voice message, this effectively shifts the 'load' (e.g., the agent resources required to service the enquiry) to another time, when agents are less busy and available to provide the response to the caller.

Phase 2—Audio Processing

Once the voice message has been provided by the caller, the Audio Processing phase 104 is started. This process involves using a speech analytics system ("SAS") to analyze the speech of the voice message from the caller. The audio processing may perform two functions. First, it may identify various keywords spoken by the caller in the message. The keywords may be then used to retrieve information resources from a knowledge base. For example, assume a customer leaves a message that includes the following keywords: "purchased", "printer", "doesn't work", "broken", "exchange." It can be deducted that the message pertains to a defective printer product the customer purchased and the enquiry pertains to replacing the product. This information may be useful to retrieve printer return policies from a corporate knowledge base, which may be useful to the agent when generating a response. The keywords could also be displayed to the agent, to inform the agent of the gist of the message.

The other function performed by audio processing may involve developing a transcript of the audio message. This is to be a word-for-word text representation of the voice message, which may be useful by itself to the agent, or to augment the information provided by displaying the keyword search results. The transcript may be used by an agent in subsequently reviewing the contents of the message for additional details that may not have been detected by the keywords. In some embodiments, reviewing a transcript of the message may be faster for an agent to review than listening to the audio of the voice message.

Phase 3—Message Queuing

The next phase is Message Queuing 106. This involves determining which agent will handle sending the response. The process of determining which agent to select may be governed by various criteria and algorithms, including which agent has the appropriate skill set and which agent is currently available. Other factors may include which agent previously interacted with the customer or which agent has a matching or best suited personality/skill based on the customer and/or message contents. Other algorithms for selecting an agent may be employed. For example, an irate customer leaving a message regarding a service problem may be routed to a specific agent who is known to be well qualified in dealing with that particular issue. Other factors may be considered, such as current workload of agents, expected decreases in workload in the immediate future (e.g., during the present shift), skill level, experience, pay level, customer value, etc.

Phase 4—Agent Presentation

The Agent Presentation phase 108 pertains to providing appropriate message related information to the agent to review in order to generate a suitable response to the caller's enquiry. A subset of the information may be presented initially to the agent, which may be sufficient for the agent to formulate the response. In various circumstances, the agent may require additional information, which is then provided to the agent in response to the agent's request.

The information presented may take various forms. The agent may be provided with a computer-generated synopsis of the enquiry. The agent may be provided with the list of detected keywords, along with various related knowledge base articles. The agent may be further provided with a transcript of the message, as well as the audio recording itself. The information may further reflect various customer account related aspects, such as the customer's prior interactions with the contact center, the topics, communication preferences, etc.

The type and form of the information presented to the agent will vary according to the application. Typically, a core subset of message related information is provided in a graphical user interface ("GUI"), such as information related to who left the message, relevant information about the caller, and potentially information about the message itself (e.g., keywords and/or transcript). The presentation of the information may also include a draft response, a menu of a draft response, and commands that the agent can invoke.

Phase 5—Agent Interaction

The Agent Interaction phase 110 pertains to the agent interacting with the GUI window. Typically, the agent interacts to review additional or further related information that may be pertinent in providing the response. The information initially presented to the agent may suffice in many instances, but in other instances, the agent may request further information, such as requesting to aurally review the original message, retrieving additional information about the caller, querying other systems regarding the customer's account, etc. The agent may also invoke various commands to dispose of the message, other than responding to it. To an extent, the information sought by the agent may be beyond the scope of the call handling system (e.g., the calling party telephone number or message duration) and may include, for example, prior account history information. For example, prior purchasing history of the caller may be contained in an enterprises' customer resource management system as opposed to the contact center call handling system.

The agent may use various user-interface techniques to interact with the system, and the nature of the additional information requested may vary from application to application. Those skilled in the art, in light of this disclosure, may devise various methods and types of information that may be provided to the agent via interactions with the presentation GUI that may be useful in compiling a response.

Phase 6—Response Generation

The Response Generation phase 112 refers to the agent generating and providing a response to the original customer's enquiry. The form of the response (i.e., channel type) may not be the same as the customer's enquiry. In various instances, guidance in the form of a suggested response may be provided to the agent in the agent presentation phase. The suggested response may utilize a channel type that is recommended, preferable, or expected when responding to the customer enquiry. Typically, the response is in the form of a voice call, SMS text, or email to the customer, though other forms are possible. In other instances, the response may involve other forms, including two or more channel types (e.g., sending a SMS text and voice call) as the response.

The contents of the response may be suggested to the agent. Thus, an artificial intelligence application could suggest a response (i.e., a draft response) to the agent, which the agent may accept, edit, or replace. In many instances, based on the keywords, a suitable draft response may be determined by the speech analytics module or some other module, and the agent is asked to verify the contents. Providing the agent with a draft response avoids the agent from having to type in the response from the beginning. In many instances, the contents of a response may be similar for a particular circumstance.

The agent may select the initially presented response, or request another suggested response. A menu of possible 'pre-canned' responses may be presented to the agent based on the detected keywords. For example, if the caller is enquiring about an order previously placed, information about when the order was placed and what was ordered can be readily ascertained. Based on known facts, such as whether an item was on backorder, or when the order should have been received, an enquiry about a recently placed order involving the keyword "missing" can likely be determined to be an enquiry about when the backordered item will be shipped. A number of related text responses may be pre-populated with suitable responses for the agent to select from or customize.

The agent may also communicate the response in a particular format different from what is suggested. For example, the agent may know that the caller is hard of hearing, and so rather than use a pre-recorded announcement to send the message, a text-based response may be more appropriate. Or, the caller may have requested a SMS text-based response, and so a SMS text message is appropriate. The caller may have given or revoked permission to send SMS texts to their cell phone, and so a pre-recorded announcement may be suitable. Or, the agent may know that a pre-recorded announcement is not suitable, and instead opt for a voice call to explain the situation to the caller.

The contents and channel type used for the response is maintained in a transaction history file so that the next time that customer calls in, information may be available, or presented, to the agent regarding prior interactions. The information presented to the agent may include who sent the response, the contents of the message sent, and how/when it was sent. This may be provided for a series of prior interactions. Thus, if a subsequent message is received where the caller repeats similar keywords as the original keywords, this may suggest that the caller is still waiting on a response, or the prior response was not responsive. Thus, the prior communications information can be reviewed by an agent when preparing to generate a current response.

Once the response is sent in operation 112, the process 100 is largely completed. The response will be recorded in a history file for that caller. At this point, the agent may be allocated for responding to other customer enquiries, or may process other instances of communications, such as inbound or outbound calls.

The benefits of the process 100 described in FIG. 1 is premised on assisting the agent's response to the caller's enquiry in some manner using the speech analytics system to analyze the enquiry. At a minimum, the time required by the agent to provide a response is reduced in some manner. In many instances, relevant information about the question may be determined and presented to the agent as a suggestion for providing a response to the enquiry. In many instances, sufficient information about the caller's enquiry can be derived so that it is likely that one of the several responses provided to the agent may be largely adequate in dealing with the caller's enquiry. If not, information relevant for the agent in preparing a response is presented or made readily available to the agent, thus reducing the time that the agent requires to investigate or retrieve such information. The agent may be able to accept the recommended response with minimal or no editing. The agent may simply verify the draft response and then send the response. In many instances, the customer's enquiry may be relatively simple, such that the response could be answered quickly via text response.

Each of the phases is now reviewed in detail. The reader will appreciate that the descriptions provided are not exhaustive, but are deemed sufficient to illustrate various common embodiments of the application thereof. While some variations are detailed, those skilled in the art are likely to be able to devise other variations after reviewing this specification.

Exemplary Call Center Architecture

Figure 2:
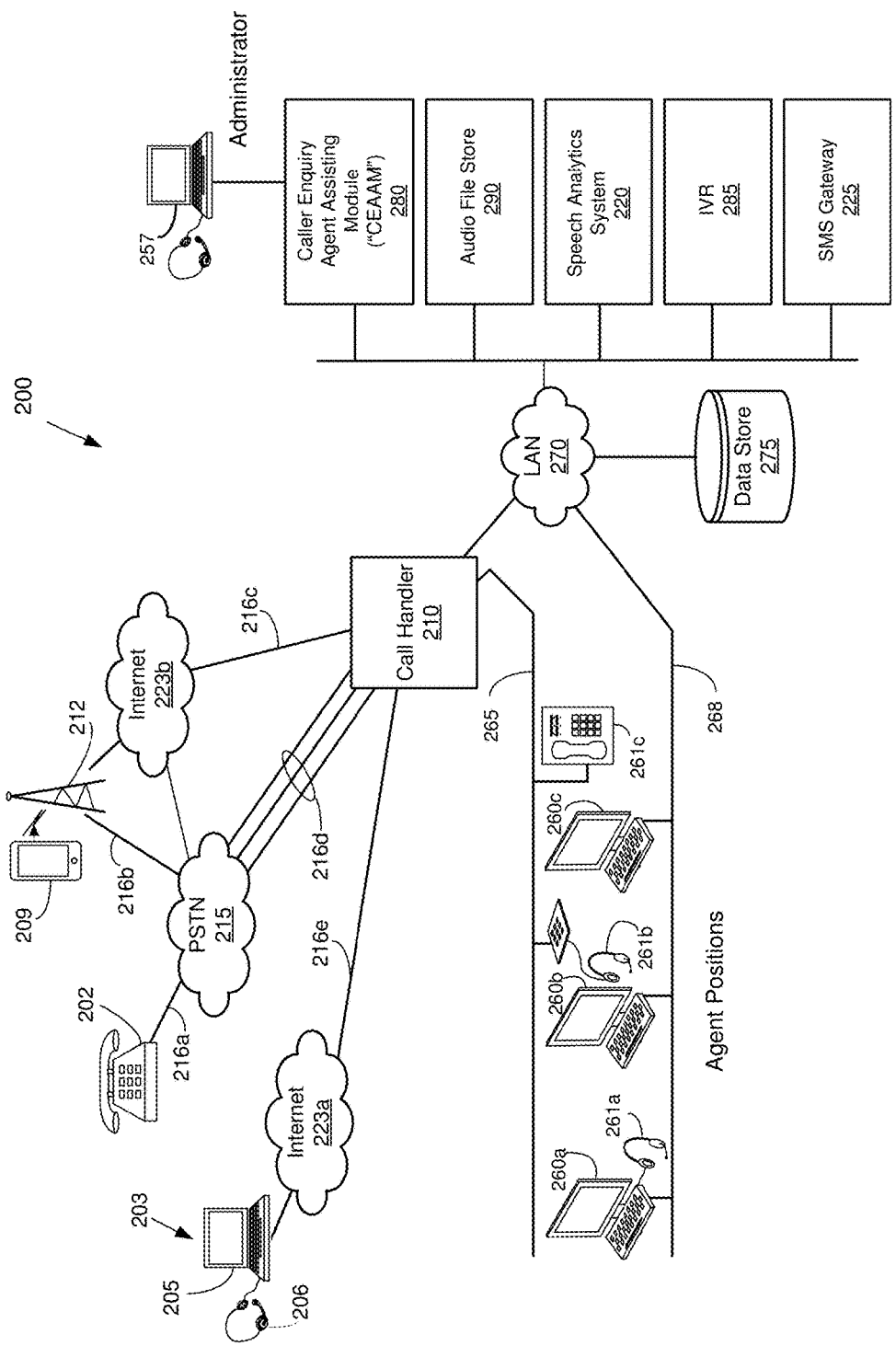
FIG. 2 illustrates one embodiment of a call center architecture for implementing the concepts and technologies disclosed herein.

FIG. 2 illustrates one embodiment of a call center architecture 200 that may be used in accordance with the various technologies disclosed herein. The call center shown in FIG. 2 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, SMS text messages (a.k.a. text calls or SMS calls), video calls, and chat messages. That is, the call center may be considered a contact center. Thus, for the purposes of the remainder of this disclosure, the term "contact center" is synonymous with "call center" to the extent that they both handle voice calls.

Since the contact center may handle calls originating from a calling party, or initiated to a called party, the term "party," without any further qualification, refers to a person associated with a call processed by the call center, where the call is either received from or placed to the party. The term "calling party," if used, will generally refer to a party communicating with the call center, but in many cases this usage is exemplary. Thus, use of the term "calling party" is not intended to limit the concepts to only inbound calls or voice calls, unless the context dictates such. Reference to the term "remote party" encompasses either a calling or called party.

Depending on the embodiment, inbound voice calls may originate from calling parties using a variety of different phone types. For instance, a calling party may originate a call from a conventional analog telephone 202 connected to a public switched telephone network ("PSTN") 215 using an analog plain old telephone service ("POTS") line 216a. The calls may be routed by the PSTN 215 and may comprise various types of facilities 216d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 209, such as a smart phone, tablet, or other mobile device, which wirelessly communicates with a mobile service provider ("MSP") 212. The voice calls may be routed to the PSTN 215 using an integrated services digital network ("ISDN") interface 216b or other types of interfaces that are well known to those skilled in the art. In particular embodiments, the MSP 212 may also route calls as packetized voice, referred to herein as voice-over-IP ("VoIP") to an Internet provider 223b using Internet-based protocols. For convenience, unless indicated otherwise, the term "trunk" refers to any type of facility 216c, 216d, or 216e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 203. In one embodiment, this device may comprise a computing device 205, such as a laptop, computing tablet, or other electronic device, which interfaces with a headphone/microphone combination, also referred to as a "headset" 206. An IP phone may use a digital voice control protocol and may process packetized voice data according to various Internet based voice protocols, such as session initiated protocol ("SIP"). The call may be conveyed by other types of Internet providers 223a, such as a cable company providing Internet access services over a coaxial cable facility 216e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call using any form of currently available technology and/or originating from any type of device, such as a soft phone 203, a conventional telephone 202, a mobile phone 209, or other device known in the art. The term "call" as used herein may encompass an active instance of two-way voice communication, an attempt to establish two-way voice communication, or a portion of the two-way communication. For example, a user at a conventional telephone 202 can dial a telephone call in an attempt to establish two-way communication, and a call can be said to exist even prior to establishment of a two-way connection. For purposes herein, sending an SMS text may also be referred to as a "text call" or "SMS call." Otherwise, reference to just "call" refers to a voice type call.

In another example, a call may be put on hold, and a portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. In certain contexts, which will be made explicit, the call may encompass communications other than voice, for example, text, email, video chat, facsimile, etc. Unless stated otherwise, a call is a voice call.

In various embodiments, inbound calls from calling parties to the call center may be received at a call handler 210, which could be, in one embodiment, an automatic call distributor ("ACD"). In particular embodiments, the call handler 210 may be a specialized switch for receiving and routing inbound calls under various conditions. Further, the call handler 210 may be embodied as a dedicated form of equipment readily available from various manufacturers, or the call handler 210 may be a so-called "soft switch" comprising a suitable programming module executed by a processing device to perform the necessary functions. The call handler 210 may route an incoming call over call center facilities 265 to an available agent. Depending on the embodiment, the facilities 265 may be any suitable technology for conveying the call, including but not limited to a local area network ("LAN"), wide area network ("WAN"), ISDN, or conventional TDM circuits. In addition, the facilities 265 may be the same or different from the facilities used to transport the call to the call handler 210.

In various embodiments, calls may be routed over facilities 265 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a specially configured computing device 260a-260c, such as a computer, and a voice device 261a-261c that is adapted for various contact center functions associated with processing communications. The combination of computing device 260a-260c and voice device 261a-261c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 261a-261c at the agent's position. Similarly, "routing the call to the agent" means routing a call to the appropriate equipment at an agent's position. The workstation typically has a display or monitor. This is used to convey information to the agent about the calls, and the agent may interact with the call handler using a mouse or other pointing device with the display.

In particular embodiments, the voice device 261a-261c used by an agent may be a soft phone device exemplified by a headset 261a connected to the computer 260a. The soft phone device may be a virtual telephone implemented in part by an application program executing on the computer 260a. Further, the phone may also comprise an Internet Protocol ("IP") based headset 261b or a conventional phone 261c. Use of the term "phone" is intended to encompass all these types of voice devices used by an agent, unless indicated otherwise.

Agents typically log onto their workstations prior to handling calls. The workstation may also communicate this to the call handler. This allows the call center (including the call handler) to know which agents are available for handling calls. In particular embodiments, the call handler 210 may also maintain data of an agent's skill level that may be used to route a specific call to the agent or group of agents having the same skill level. In particular instances, if a suitable agent is not available to handle a call, the call handler 210 may queue the call for the next available agent. As can be expected, various algorithms may be employed to process calls in an efficient manner.

In various embodiments, two types of signaling information may be provided with an inbound call that may be used by the call handler 210 in processing the call. The first type of signaling information indicates the telephone number dialed by the calling party, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the call handler 210 may use the DNIS to determine the purpose of the call, and potentially identify a group of agents having the appropriate skill level to handle the call. Thus, in various embodiments, the call handler 210 may prioritize and route calls to an agent based on the required skill level. Skills-based routing may be a rule-based set of instructions that the call handler 210 uses to handle calls. Depending on the embodiment, skills-based routing may be implemented by the call handler 210, or by the call handler 210 interacting with a computer-telephone integrated ("CTI") server (not shown).

The second type of signaling information that may be provided with an inbound call is the calling telephone number, often referred to as automatic number identification or "ANI." In particular embodiments, the call handler 210 and/or CTI server may use the ANI of an incoming call to retrieve caller information from a data store 275 and provide the data to an agent's workstation computer 260a-260c over facilities 268 along with routing the call to the agent's workstation phone 261a-261c. Further, in particular embodiments, the ANI may also be used to ascertain a party's status (e.g., a "Gold Level" customer warranting premium service), determine whether consent has been received by a party for particular services or actions, and/or to facilitate the call handler 210 routing the call to a select group of agents. Depending on the embodiment, the data store 275 may include one or more databases storing different information such as, for example, records of caller information. Further, the data store 275 may be integrated with the call handler 210 or segregated as a standalone medium or media.

In various embodiments, the call handler 210 may place a call (either an inbound or outbound call) in a queue if there are no suitable agents available, and/or it may route the call to an interactive voice response system ("IVR") 285 to play voice prompts. In particular embodiments, these prompts may be defined to be in a menu type structure and the IVR 285 may collect and analyze responses from the party in the form of dual-tone multiple frequency ("DMTF") tones and/or speech. In addition, the IVR 285 may be used to further identify the purpose of the call, such as, for example, prompting the party to enter account information or otherwise obtain information used to service the call. Further, in particular embodiments, the IVR 285 may interact with other components, such as the CTI server or the data store 275, to retrieve or provide information for processing the call. In other configurations, the IVR 285 may be used to only provide announcements.

Depending on the embodiment, the interaction between the various components shown may involve using a local area network ("LAN") 270. However, other configurations are possible, such as, but not limited to, using a wide area network, wireless network, router, bridge, direct point-to-point links, etc. Thus, in lieu of facility 265 for conveying audio to the agents, the facilities associated with the LAN 270 may be used.

In particular embodiments, when an agent is interacting with a called or calling party, the agent may use his workstation computer 260a-260c to further interact with other enterprise computing systems, such as, for example, a customer relationship management ("CRM") server (not shown). A CRM server may be used to integrate information from various enterprise business systems to facilitate the agent servicing the call. In addition, the CRM server may provide a variety of applications.

In addition to receiving inbound communications, including, for example, voice calls, emails, SMS text messages, and facsimiles, the contact center may also originate communications to a called party, referred to herein as "outbound" communications. In some embodiments, the call handler 210 may be a dialer, such as a predictive dialer, that originates outbound calls at a rate designed to meet various criteria. The predictive dialer may then connect an agent at a workstation with the outbound call via a call leg after the remote party answers. Similar to the other components within the call center architecture 200, depending on the embodiment, the dialer may comprise one or more software modules executing on a processing device hardware platform.

In various embodiments, the call handler 210 is typically configured to dial a list of telephone numbers to initiate outbound calls. Thus, in some embodiments, the call handler 210 may include functionality for originating calls, and if so, this functionality may be embodied as a private automatic branch exchange ("PBX" or "PABX"). Further, in other embodiments, the call handler 210 may directly interface with voice trunks using facilities 216c, 216d, and 216e to the PSTN 215 and/or Internet providers 223a, 223b for originating calls. After the calls are originated, a transfer operation by the call handler 210 may connect the call with an agent or a queue, or in some instances the IVR. In various embodiments, the call handler 210 may make use of one or more algorithms to determine how and when to dial a list of numbers so as to minimize the likelihood of a called party being placed in a queue while maintaining target agent utilization.

Also shown is a Speech Analytics System ("SAS") 220 which may be a real-time speech analytics ("RTSA") system. This typically monitors the speech during a call, and is able to monitor both the agent's and the remote party's speech. This is typically accomplished by using a conference bridge or similar function in the call handler 210, with a conference call leg to the SAS 220, although the SAS only listens to the speech, and does not interject any speech into the conference bridge. The conference call leg to the SAS 220 may be unidirectional. The SAS system typically interfaces with the LAN 270 to communicate with other components, including the call handler 210 and a caller enquiry agent assisting module ("CEAAM") 280.

The SAS is configured to detect certain speech conditions in certain contexts. These speech conditions detected are also known as "topics" or "keywords" since it refers to speech in a particular context. Thus, the SAS can be configured to detect an agent's response to a particular question asked by the remote party, or ensure that the agent properly introduced themselves at the beginning of the call. The SAS can be configured to detect each speech condition and report its detection to the CEAAM. The messages generated by the SAS may be referred to as "event messages" and may convey information of a detected keyword.

FIG. 2 also discloses an SMS gateway 225, which is used to initiate the sending of an SMS text via an appropriate carrier. The SMS gateway 225 may be located in the contact center, or may be provided by a third party service provider external to the contact center. Thus, in one embodiment, the contact center may send an email or other message format to the third party service provider that then sends the actual SMS text based on the contents of the email or other message format. The SMS text is sent to the wireless caller, who has left a voice message. Most wireless phones have the capability of displaying a received SMS text message. However, not all wireless subscribers may subscribe to a texting service in their wireless service plan. Those skilled in the art will be aware that various other architectural variations are possible for sending a SMS text message from a contact center.

The audio file store 290 is another form of data store, but which is largely dedicated for storing the recorded audio messages. In various embodiments, when the caller leaves a voice message it is received by the IVR, and either the IVR or the audio file store may ultimately store the audio message. In other embodiments, the data store 275 and the audio file store 290 may be integrated into one storage device. In other embodiments, the voice message could be stored in the IVR, call handler, or the CEAAM.

Although a number of the above components may be referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the call handler 210 or other component may be combined into a single hardware platform executing one or more software modules. In addition, the call center architecture 200 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the call center.

Those skilled in art will recognize FIG. 2 represents one possible configuration of a call center architecture 200, and that variations are possible with respect to the protocols, facilities, components, technologies, and equipment used. For example, various algorithms and queuing arrangements may be defined to efficiently process and/or place calls.

Voice Message Processing Architecture

Figure 3:
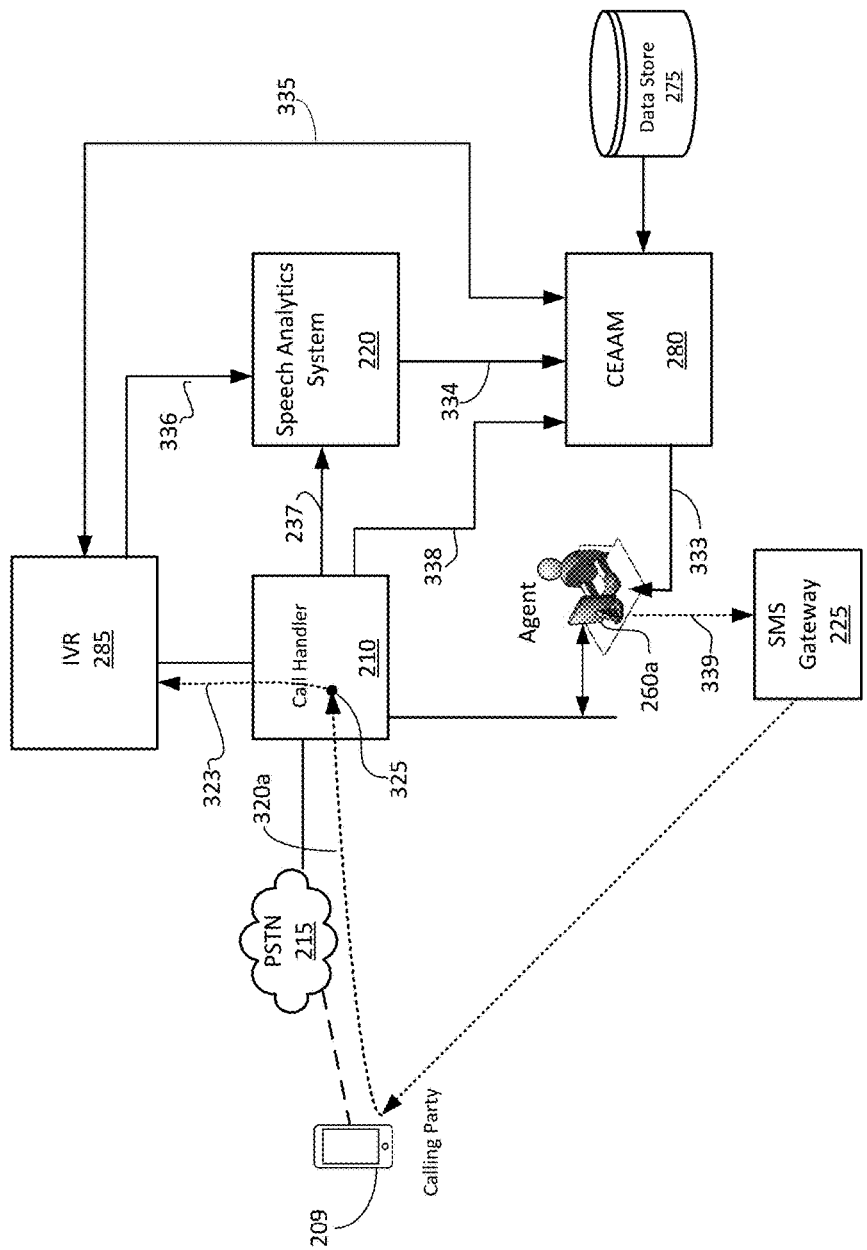
FIG. 3 illustrates another embodiment of a call center architecture for implementing the concepts and technologies disclosed herein.

While FIG. 2 shows one embodiment of a contact center in which the concepts and technologies herein may be applied, FIG. 3 shows a more focused depiction of one embodiment of the contact center components and how they communicate. Turning to FIG. 2, a calling party may originate a call to a call handler 210 from a smart phone 209 (or using another type of telephone device). The call 320a may be routed by the PSTN 215 to the call handler 210. The call handler 210 may route the call via a call leg 323 to the IVR 285. This may occur if no agents are available, or regardless of whether any agents are available. Once the caller interacts with the IVR, the caller may leave a voice message with the understanding that a subsequent response will be provided to the caller. If the caller is calling from a wireless phone 209, which can be determined from the calling party number of the call, then the IVR may provide an option or indication that the response may be sent via a SMS text to the caller's smartphone 209.

The call handler 210 may inform the CEAAM 280 of the call via signaling link 338. This lets the CEAAM know about the voice message. In other embodiments, the CEAAM may be informed about the voice message via the SAS 220 via link 334 or the IVR via link 335.

The IVR, once the voice message is received, may store the voice message in memory, or in a separate file store. IN this embodiment, the IVR 285 may inform the speech analytics system ("SAS") 220 of the existence of the new voice message, or may transfer the voice message to the SAS via link 336. In other embodiments, the SAS may be informed by the call handler via link 237. Regardless of which embodiment may be used, the SAS 220 knows when a voice message is ready for processing.

Another embodiment involves bridging the SAS 220 onto the call by the call handler via call leg over link 237 while the caller is leaving a voice message. This allows the SAS to process the voice message in real time. Because the caller is expecting a response subsequent to leaving the voice message, the SAS is not required to be bridged on the call for real-time processing. It is typically acceptable for the SAS to perform non-real time processing of the voice message (e.g., processing the voice message after it has been received by the IVR and stored in memory, whether primary or secondary memory).

It should be apparent to one skilled in the art, that there are various ways that the SAS can ingest the voice message to begin processing it. Once the SAS receives the voice message or accesses the voice message from memory, the SAS can process it to identify the keywords that are to be detected as well as develop a transcript of the voice message. This is provided to the CEAAM via link 220.

The CEAAM knows about the voice message, including the calling party number, and is able to retrieve any necessary account information or other relevant information from the data store 275. Further, the CEAAM may use the keywords received from the SAS to perform a search for relevant resources from the data store 275. It should be evident that the data store 275 may comprise a number of different data stores, some which may be internal or external to the contact center. Thus, even though there may be multiple data stores, a single data store 275 is shown in FIG. 3 for simplicity.

The CEAAM will use the information it collects from the data store 275 and that is provided by the SAS 222 to then generate a draft response that is provided via link 333 to the agent's computer 260a for display to the agent. The CEAAM may have various rules and artificial intelligence algorithms to create a draft response or select a draft response from among a library of common draft responses. Further, the CEAAM may provide the draft response to the agent in various forms. For example, the CEAMM may provide the text of a response message to be provided to the caller via SMS, instant message, fax, or email. The CEAMM may provide text to the agent that the agent is to read or convey to the caller via a voice call by the agent. Or, the CEAMM may provide text for a text-to-speech engine to process to announce the response to the caller in a voice callback.

The CEAMM may provide the draft response text in one form, and allow the agent to 'convert' it into another form. In other words, the CEAMM may display draft response text which is proposed to be sent as a SMS text, but the agent may invoke a function to have that text sent as an email or fax. Or, the agent may invoke a function which causes the draft response text to be voiced to the caller in a voice callback using a text-to-speech engine. Or, the CEAMM may simply create a voice callback so that the agent can read the proposed response text to the caller.

Turning back to FIG. 3, once the agent issues a command, the CEAAM will then send the response in the appropriate manner (e.g., as a SMS text, fax, email, announcement, etc.). In the embodiment shown in FIG. 3, the response may comprise a command 339 sent to a SMS gateway 225 that causes the SMS gateway 225 to send a SMS text. The various components that may be involved in sending the SMS text are not shown for simplicity, and those skilled in the art will recognize that a variety of approaches/component may be used or involved to allow an agent in a contact center to send a SMS text.

Process Flow: Phase 1: Message Receipt

Call Flow

Figure 4:
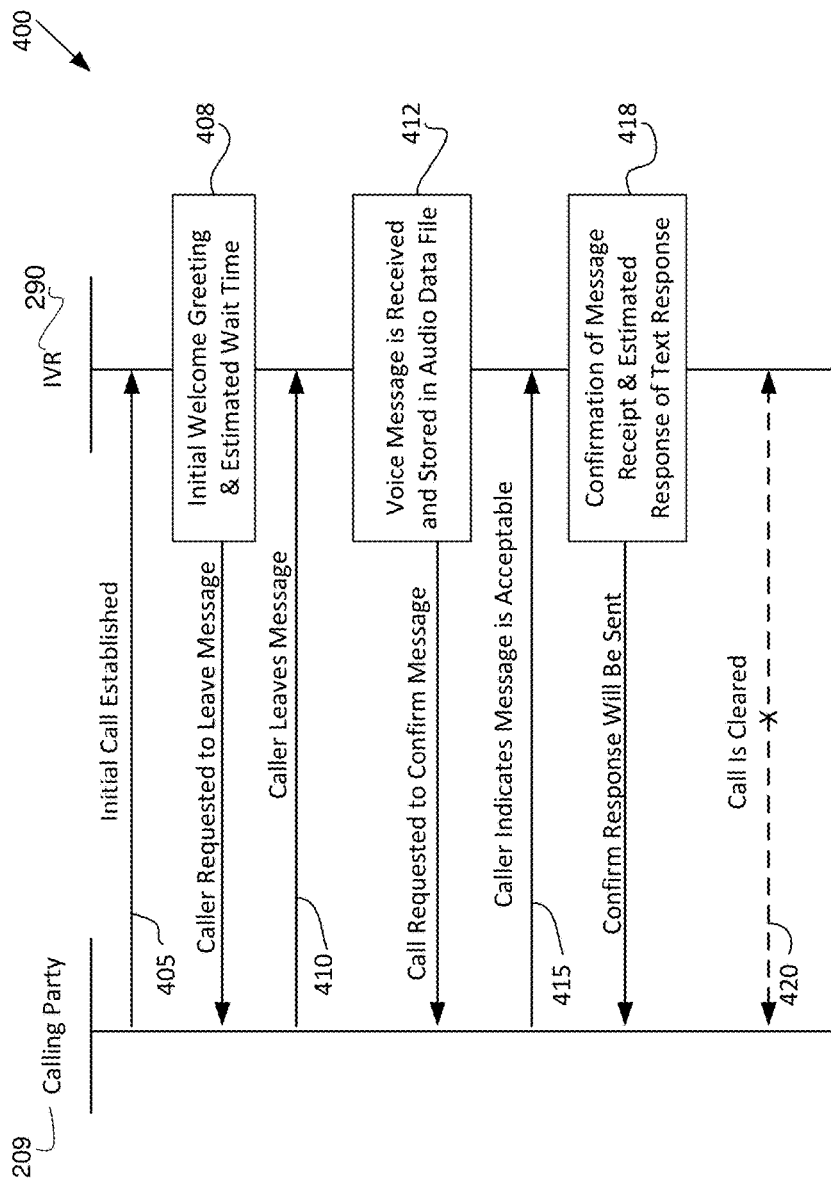
FIG. 4 illustrates one embodiment processes associated with a caller leaving a voice message according to the concepts and technologies disclosed herein.

The call flow for the Message Receipt phase is shown in FIG. 4. This depicts the call flow with respect to the originating entity (calling party) and the terminating entity (IVR). Turning to FIG. 4, the call flow 400 shows the interaction between the calling party 209 and the IVR 290 in terms of steps related to the call. The process begins with a call 405 originated by the calling party 209 to the IVR 290. This may involve the calling party dialing a particular toll free number of a contact center. The contact center may accept the call and upon determining an agent is unavailable, immediately route the call to an IVR. However, the contact center may normally route the call first to the IVR 290, if an agent is not available or regardless thereof. For example, a specific number could be published for handling caller enquiries using the procedures disclosed herein that routes the call directly to the IVR. In addition, a separate number could be published for having an agent handling the caller enquiry. This approach allows the caller to decide whether to dial a number that routes to an agent, if available, or dial another number which accepts a voice message and results in a subsequent response. Alternatively, the number dialed by the caller could be connected to an agent if one is available, but is routed to an IVR if there is a wait for an agent. While in the IVR, the caller can then leave a message.

Assume for purposes of illustration, that the IVR will answer the call and provide a welcome greeting to the caller in operation 408. In addition, the IVR may determine an estimated wait time for the caller based on the number of agents, pending calls being handled by the agents, and pending calls waiting in the queue. The IVR may inform the caller of the wait time, and may be configured so that if the wait time is above a certain threshold, the IVR may ask the calling party whether they would like to leave a message, in lieu of waiting for an available agent. The logic is that if the caller is about to be shortly serviced by an agent, then leaving a message may actually not save much time for the caller. If the wait time may be a long while, then it may be desirable to ask the caller now whether they would like to leave a message rather than forcing them to wait a while before they are presented with this option.

In this embodiment, it is presumed that the caller is prompted as to whether they would like to leave a message for a SMS text callback response at operation 408, and the caller leaves the message in operation 410. Typically, the instructions will ask the caller to leave a brief message, or to state the purpose of their enquiry or the question they would like answered. The instructions may also inform the caller that an answer will be provided to the caller at a later time, either via a voice recording or a text response.

If the IVR is able to ascertain the type of calling number associated with the calling party (e.g., whether the calling number is a wireless or wireline number), then the IVR can offer the calling party the option of receiving the response via a SMS text. If IVR ascertains the caller is calling from a wireline number (or unknown type), then the option of sending a SMS text response should not be provided, since a wireline number cannot receive a SMS text. In other embodiments, various options can be presented to the caller as to whether they prefer: a voice recording callback response, an email response, a fax response, as well as the time of the callback, and the number where the callback is to occur.

The caller may receive a callback that plays an audio recording or receives a SMS text callback to their cellphone number. If so, this may have various regulatory implications. It may be that the IVR maintains a recording of the prompts and caller responses at operation 408, so that it can be subsequently confirmed that the caller consented to receive a call back in response to their enquiry. The IVR may further confirm the telephone number that the response is to be sent to. This is because the caller's consent may be required to satisfy regulatory requirements, and such consent may be required to be recorded to demonstrate such consent.

Once the instructions, preferences, and consent is obtained, the calling party can then leave their message in operation 410 and it will be stored and confirmed in operation 412. As is well known in the area of voice messaging, the user may have the option to review their message, re-record their message, or delete it before completing the message. This can be accomplished using various touch-tones for signaling to rewind, play, re-record, and accept the message they left. Once the caller confirms their message at point 415, which may be indicated via various touch-tone or voice commands, the IVR will then confirm receipt of the message in operation 418. The IVR may also provide an estimated time of the response and confirm the channel type of the response (e.g., audio or text). The IVR may also confirm the number that the call/text will be sent to. Once all the necessary interactions are completed, then the call may be cleared in operation 420.

The user interaction with the IVR may vary from what is described. Using an IVR provides flexibility as to what inputs are provided from the caller. For example, the IVR can simply inform the caller that a callback will occur as soon as possible or the IVR can ask the caller if a particular time window is preferred. The IVR can even allow the caller to specify a particular time, channel, or other preferences. The IVR may allow the caller to request leaving a voice message at any time while waiting for an agent. The IVR may also ascertain whether the audio is sufficient to provide useful information. For example, the IVR may detect significant background noise or interrupted speech that is likely to impede any analysis of the speech (whether by a speech analytics system or a human). Or, the IVR may detect a lengthy message, which may be too difficult to provide a useful response. Thus, the IVR may inform the caller to re-record the announcement.

Figure 5:
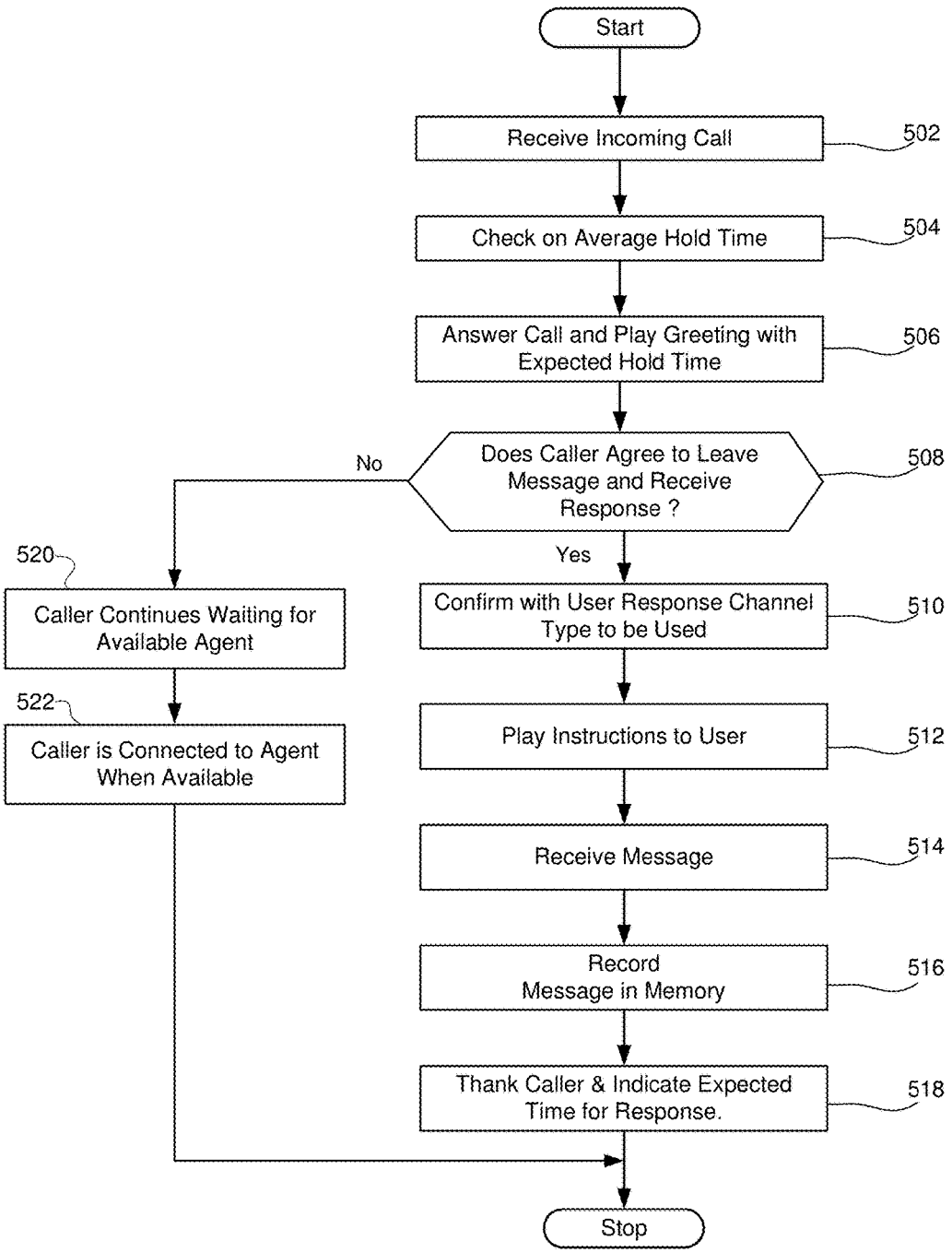
FIG. 5 illustrates another embodiment of a process flow associated with a caller leaving a voice message.

FIG. 5 shows another embodiment of the IVR processing associated with this initial phase. Turning to FIG. 5, the process begins with the IVR receiving a call in operation 502. The telephone number to which the call is directed to may be associated with the customer enquiry agent assist ("CEAA") capability. Thus, each incoming call may be directed initially to an IVR, and the IVR may check on the average hold time for new incoming calls in operation 504. Next, the IVR answers the call in operation 506 and plays a welcome greeting, along with the expected hold time (e.g., until an agent is available to service the call). Thus, the greeting played may vary depending the current hold time. In other embodiments, the IVR may simply answer the call, play a welcome greeting, and request the caller to leave a message in order to receive a subsequent response message, regardless of whether an agent is available or not.

Assuming there is a significant hold time, the caller may be prompted in operation 508 to leave a voice message with the promise of receiving a response at a later time. This may include information that the response will be sent as a SMS text (if the caller has a wireless number) or that it will be sent as a prerecorded announcement addressing their enquiry if they have a wireline number. The caller could also be provided with a brief overview of the CEAA capability, given the option of requesting a voice call back immediately or at a selected time, etc.

Those skilled in the art will recognize that there are variations possible in the flow. For example, if the wait time is very low, the caller may not be informed of the wait time, and may be simply queued to the next agent. In other embodiments, the caller may be always prompted to leave a message for a subsequent response, even if the wait time is relatively short.

If the caller chooses to not leave a message for a subsequent response, then the caller will continue to wait for an available agent in operation 520 and is connected to an agent when one is available in operation 522. However, if the caller does agree to leave a message and receive a subsequent response in operation 508, the process continues to operation 510, where additional instructions and prompts may be provided to the caller. These prompts may confirm the channel type that should be used, e.g., does the caller want to receive a SMS text message (assuming they have a wireless number/smartphone), a recorded voice message, or a live voice callback. The caller's confirmation and/or request may be recorded by the IVR, as it may be appropriate to record the consent of the caller to receive the subsequent call. Recording the confirmation of the caller may be useful to demonstrate consent of the caller when the response is generated by an autodialer.

The IVR may also provide additional instructions to the user in operation 512. This may inform the caller to leave a short and succinct message about their enquiry (e.g., the caller may be informed that their message should be no more than 20-40 seconds in length). The instructions may also confirm that the response will be directed to the telephone number that they are currently calling from, and inform the caller of an expected response time. The IVR may inform the caller that a response may be provided the next day during business hours, or the IVR may seek permission to send the response after certain times (e.g., after 9:00 p.m. of the caller's local time). Various other interactions are possible to facilitate customer service and inform the user of other options.

At this point, the caller is ready to provide their message, which is received in operation 514. Although not detailed in this figure, the user may be able to review, re-record, delete, or finalize the voice message to the IVR. Further, the system may indicate to the user if the message is too long or too short, if there is excessive background noise, the volume is too low, or there are other conditions that may impede responding to the caller's voice message.

The message is recorded in memory as it is received as illustrated in operation 516. This includes indexing of data of the voice message as appropriate for future retrieval. This would include, for example, indexing the time of the call, duration of the message, the caller's originating telephone number, and other responses from the customer that are relevant (e.g., that the customer indicated a SMS text versus a voice call response, or that the caller confirmed receiving a SMS text callback, etc.). The caller is then thanked for leaving their message and an expected time for a response may be indicated at operation 518. The process of the caller leaving a voice message is completed.

As evident, this phase is characterized by the caller leaving the enquiry message, which can occur under various circumstances, and is not limited to those described herein. Once the voice message is obtained, the process then continues with processing the voice message in the contact center, but which does not involve the caller until the response is generated.

Phase 2: Audio Processing

Audio processing of the caller's voice message typically involves two separate actions, which can occur serially or in parallel. One processing action involves processing the audio to identify one or more keywords spoken in the caller's enquiry. Another processing action involves processing the audio to develop a transcript of the enquiry. These may be combined in to one audio processing action, or may occur as two distinct audio processing actions.

Keywords

The purpose of determining the keywords is multi-purpose; the keywords may be potentially used to identify knowledge base resources, identify the nature of the enquiry, and potentially identify a proposed response to the enquiry. It should be recognized that other functions may be performed using the keywords. The keywords may indicate at a high level whether the customer enquiry is, for example: a general question, a customer complaint, a specific specialized enquiry, product related questions, etc. Identifying the overall nature of the enquiry may be useful to determine a skill set of an agent needed to address the caller's enquiry, the priority in responding to the issue, and other resources required by the agent to response to the enquiry.

Keywords may indicate that certain specific information may have to be accessed in order to address the enquiry. For example, if the enquiry pertains to a customer's account status, then customer resource management ("CRM") systems may have to be accessed to retrieve current information for that customer's account. Similarly, if the customer enquiry pertains to an order, then information regarding recent orders may be retrieved in anticipation of an agent or other representative requiring such information. Thus, after the keywords are identified, another process may combine information related to the keyword along with an account associated with the calling telephone number so as to retrieve the relevant information that the agent may need from a CRM.

This keyword information may also identify which skill level or organization is best equipped to address the enquiry. There may be agents working in separate groups which address product enquiries, returns, orders, or billing issues. Knowing at a high level which category the enquiry involves may ensure that the enquiry is handled by the appropriate agent skills group. Otherwise, the enquiry may be processed by an individual who is not qualified and has to then forward the work item to an appropriate group. While a skill level may be determined by the number dialed, the keywords may provide further granularity as to the nature of the skill required.

The determination of the keywords may be useful to gather other information, e.g. resources, related to enquiry. For example, if the question pertains to a product return, the company may have defined new or different procedures for a particular product. Knowing the nature of the product and the fact that the enquiry relates to a product return could allow an algorithm to retrieve or identify articles from a knowledge base with information about recently defined return procedures for that product.

It is even possible to use the keywords to formulate a suggested response to the caller. If the question is directed to store locations and hours, a text message containing such information is can be drafted for review by the agent assigned to generate the response. Or, a number of stock text messages responses, which may be relevant, may be identified for the agent to select or use as a baseline, e.g., to edit it as appropriate. The response may contain public facing URLs that the agent can include in a response to direct the caller to. Thus, instead of providing the caller with the information directly, address information of potentially relevant sources could be provided in the response.

The additional processing done using the keywords may be performed during this phase, or may be performed during the Agent Presentation phase, which is phase 4. It is discussed in this phase so as to illustrate why keyword detection is performed, but could be performed only in response to an agent's explicit request.

Keywords may be grouped into a keyword set, and each keyword set may be referred to as a "topic." An example can illustrate the relationship. An individual may provide an affirmative response when asked a question. The exact speech spoken by the individual may be "yes", but it could also be "yeah", "okay", "all right", "sure", "correct." Each of these responses may be defined as a keyword, and makeup the keyword set or topic referred to as "yes." Thus, the speech analytics system may detect each of these particular keywords (a.k.a. a "phrase") in a person's speech and report out the detection as the detection of the "yes" topic as opposed to one of several keywords that conveys the same concept. Thus, reference to the "yes" topic should make it logically clear that the person indicated an affirmation of some sort, and reference to the "yes" topic appropriately hides the details as to actual keyword spoken. In many cases, the important aspect is to know whether a person indicated affirmance, as opposed to whether they said "okay," "sure," or "yes." Thus, any of these phrases is reported as detecting the "yes" topic. In another example, if a contact center handles calls dealing with product returns and billing issues, then it may be appropriate to define a "billing" topic that recognizes various keywords such as "bill", "charge slip", "invoice", and "receipt." Similarly, the "product return" topic may recognize "exchange", "return", "defective", or "replace" as keywords. Thus, although reference may be made to a keyword in a particular instance, the logic typically focuses on the topic associated with the keyword.

Frequently, the name of the topic may also reflect a keyword in the topic's keyword set. In the above example, "yes" is a keyword that may be associated with the "yes" topic. Frequently, the logic associated with processing an enquiry is simply based on the topic, as opposed to the particular keyword spoken. As can be expected, the keywords in a topic may be refined and expanded over time and experience, but this should not change the logic in processing the topic.

Transcription

The transcription of the enquiry serves a different purpose, in that it is largely geared as a document intended for human processing, in contrast to the keywords, which are mainly intended for automated processing in some form. The transcription of the enquiry is intended to be viewed by the agent, if necessary, to confirm or clarify the scope of the enquiry. It is well known that a human can process written text at 250-300 words per minute, with some easily able to read at 400-600 words (or even more) per minute. However, individuals typically can listen to words at 150-160 words per minute, and when speaking, individuals will dictate at 105 words per minute. Thus, an agent reviewing a transcript of a verbal enquiry can frequently ingest the information at a higher speed than listening to an audio recording or listening to the caller state the message. This saves agent time, and further results in a more efficient response to the caller's enquiry.

In addition to displaying the transcript to the agent, the agent may be also presented with the keywords (or the topics) that are detected. There are likely to exist instances that when even if presented with the keywords, the agent may not have a sufficient or accurate understanding of the nature of the enquiry. The keywords or topics may not convey the nuances of the enquiry, and hence the agent may be presented with the transcript. Mechanisms can be defined to further allow the agent to scroll, search, or review the transcript and/or keywords as needed. In various embodiment, the transcript may be automatically presented to the agent, or the agent may be presented with the transcript upon request.

Audio Processing Process Flow

Figure 6:
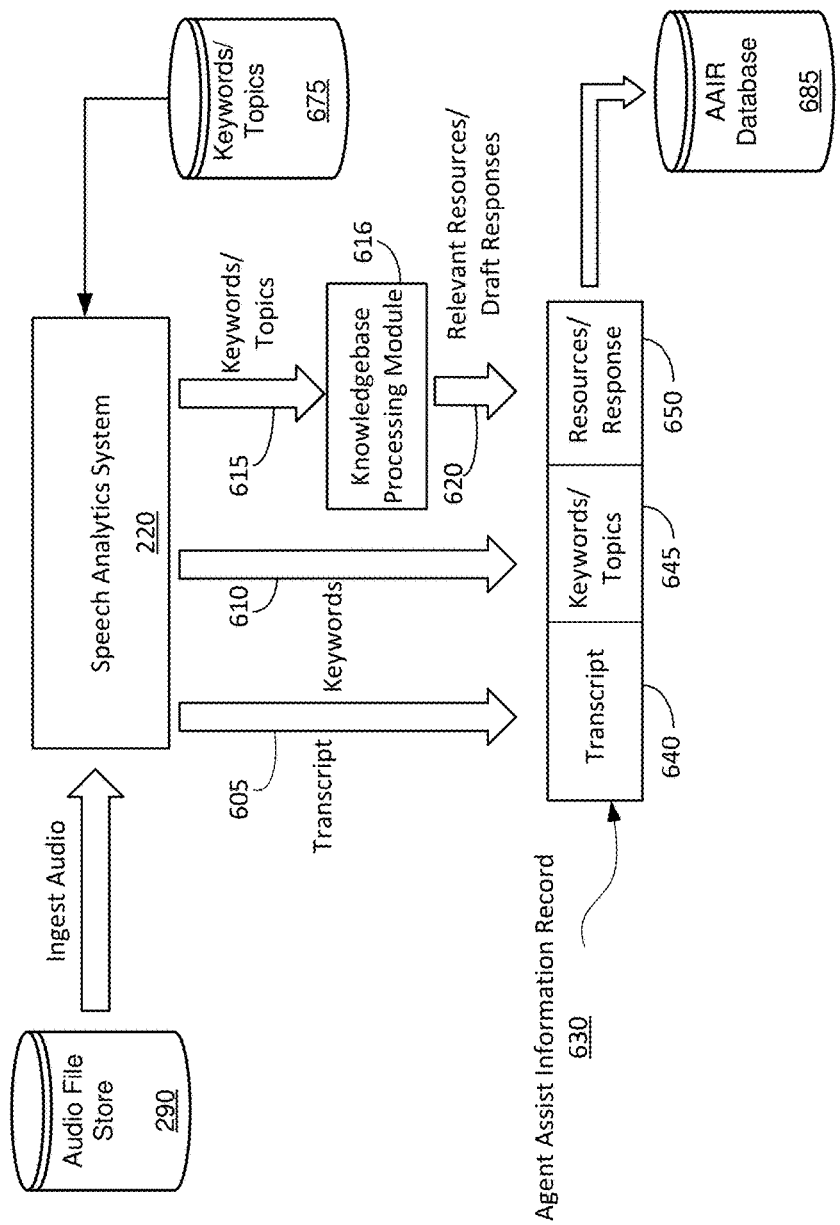
FIG. 6 illustrates an embodiment of processes associated with a speech analytics system processing a voice message according to the concepts and technologies disclosed herein.

One embodiment of the audio processing flow is shown in FIG. 6. This embodiment presumes that the audio voice message has been left by the caller and is stored in the audio file store 290 of FIG. 6. A voice message is ingested by the speech analytic systems 220 by retrieving the audio from the audio file store 290. In this embodiment, the Speech Analytics System ("SAS") 220 may be a real-time SAS, but that is not necessary, since the analysis by the SAS is done after the voice message is left. The SAS may be notified by the call handler 210 or the IVR 285 when a caller has left a voice message, which may trigger the SAS to retrieve the voice message. The SAS may also be referred to as a speech analytics subsystem or speech analytics module, in various embodiments.

The SAS 220 processes the audio using a keywords of one or more topics indicated in a keyword/topic database 675. The keyword/topic database contains keywords that are to be searched for in the audio of the voice message. In some contexts, there may be a specific set of topics to be used based on the number dialed by the caller. For example, an enterprise may have a toll free number for customer service and another toll free number for billing enquiries. Thus, when a caller reaches the IVR upon calling one of these numbers, the enquiry can be presumed to be directed to either customer service or billing, depending on the number dialed. Thus, an indication of what dialed number the voice message is associated with can indicate the nature of the voice message, and indicate an appropriate keyword/topic set to use in analyzing the audio. Thus, the keyword/topics stored in the database 675 may be logically grouped depending on the embodiment.

The SAS 220 analyzes the audio to produce two types of output. The first type of output is a transcript 605. This is a text-based file representing the contents of the voice message. This information is provided to an agent assist information record 630 that stores the transcript 640. The transcript is intended to be provided to the agent, if required, to further understand the contents of the voice message left by the caller.

The second type of output produced by the SAS 220 are keywords/topics. In one embodiment, this output could be as an ordered pair of each keyword detected and the topic it is associated with. Or, it simply could be provided as the topic. This output may be provided as an output 610 that is stored in the agent assist information record 630 as a set of keywords/topics 645. Another copy of this output 615 is provided to a knowledge base processing module 616 that may use it to select subset of the keywords to ascertain appropriate knowledge base resources, such as articles, policies, tips, etc. These resources may collected as an output 620 that is also stored as such 650 in the agent assist information record 630.

In other embodiments, the SAS 220 may process the audio to create a transcript and from the transcript then create a set of keywords. This is an implementation option that does not alter the principles of the invention herein.

The knowledge base processing module 616 may not only identify relevant resources that may be useful to the agent in formulating the response to the caller, but it may also generate a draft text-based response. As artificial intelligence applications develop and become more sophisticated, the knowledge base processing module 616 may incorporate such logic to aid in producing draft text responses. These responses could be text suitable for transmitting via SMS, which are typically limited in character length. The keywords/topics may provide sufficient information to generate a draft text, which the agent may subsequently edit or modify before actually sending to the caller, thus saving time for the agent. It is not even necessary for the draft response to fully address the caller's enquiry, as the draft response may include a publically accessible URL to a web-page that could provide the caller an answer related to their enquiry. For example, if the caller is enquiring about the status of an order, the knowledge base processing module could merely respond with a URL of an order status web page that the caller could then access to see their order status.

In more sophisticated embodiments, the knowledge base processing module could have application level programming interfaces ("APIs") to other systems that can store and provide information that may be relevant to responding to the caller's enquiry. For example, in lieu of providing a ULR to a web-page for checking the status, the knowledge base processing module could actually query the order status system for the information, and include that information in a draft response. APIs may be provided to various systems for account balance information, purchasing history, order status, exchange/return status, etc. The incorporation of API's for gathering information to other internal systems largely depends on the business of an enterprise. For example, an airline may incorporate APIs to various flight scheduling systems and/or ticketing systems. A bank may provide APIs into various checking/savings/credit card account systems. A manufacturer may have APIs into various product shipping, ordering, and account/billing systems. This level of sophistication allows the knowledge base processing module to anticipate what information may be required by the agent to adequately respond to the caller's enquiry, and therefore save time of the agent by providing the necessary resources available and/or a draft response. The output 620 of the draft response and resources are stored in a corresponding field 650 in the agent assist information record.

The agent assist information record ("AAIR") 630 can be structured in various ways, and is described as a record in this embodiment. The AAIR 630 is the collection of information that is obtained and gathered in one logical structure that includes all the information itself, or location information where to locate that information, which may be useful when the agent prepares a response to a particular voice message. In other embodiments, the AAIR 630 may comprises separate, but linked structures, so as to make up a single logical structure.

Although not shown in FIG. 6, the AAIR 630 may include other information. For example, the AAIR may also store an index or other linkage to the original audio recording, though this is not shown in FIG. 6. The AAIR may also store other information relevant to the voice message that may be useful when responding to the caller. For example, an overall transaction number could be used to identify all information related to a single transaction or voice message. As will be discussed further, not all the information in the AAIR is necessarily required by the agent when preparing the response, but if the information is required, it can be readily used or retrieved by the agent. The AAIR can be stored in an AAIR database 685 with other AAIRs, allowing ready access from a central location when agents are available to process the responses.

Phase 3—Message Queuing

The Message Queuing phase involves scheduling the processing of a voice message by an agent for providing a response to the caller. Since the voice message will be linked to a particular AAIR, the message queuing operation can be thought of scheduling the next agent to process the AAIR, or vice versa (scheduling the next AAIR to an agent). Thus, selecting the agent to process a particular AAIR may also be referred to as: "selecting an agent to service a voice message," "determining which agent should respond to a voice message," or other similar phrases.

There are various approaches for determining how and when an agent will service an AAIR. These may be based on various factors or criteria, and the following examples merely illustrate some approaches, which are not intended to limit any approach or exclude other variations.

First Available Agent

This approach attempts to minimize the time between the creation of the AAIR (or when the caller leaves the message) and the time that an agent begins to work on responding to the voice message. A scheduling module will periodically check, or otherwise be informed, when a new AAIR is added to the AAIR database. It will then monitor the status of a pool of agents to ascertain which agent is available. In one embodiment, the first available agent is selected to handle the next AAIR. That agent may be indicated as busy to the call handling system (so that the same agent is not selected to handle other inbound or outbound voice calls or other communications). The selected agent may then be informed that an AAIR is available for them to handle.

While this approach may minimize the time for an agent being selected to respond to a voice message, it may interrupt other, more important, activities by allocating available agents to respond to voice messages. Further, the next available agent may not be the best agent suited for responding to the voice message. Thus, this algorithm for selecting an agent may be combined or augmented with other schemes.

Skills Matching

This approach attempts to determine whether a necessary skill is required for responding to an enquiry, and if so, what that skill may be required, prior to selecting an agent. Once the necessary skills are determined, the required skill can be matched against a skill listing for agents, and an agent can be selected. Then, at an appropriate time, a notification can be sent to that agent informing them about the particular pending voice message that needs to be processed.

The required skills may be determined based on the contents of the voice message, the original telephone number dialed by the caller, or other factors. For example, the caller may have dialed a number of a bank for handling student loan enquiries and may have spoken with a Spanish accent or may have spoken in Spanish. The SAS may detect the accent, and coupled with the fact the caller called a telephone number associated with student loan enquiries, the required skill may involve a Spanish speaking agent capable of answering questions of student loan. In a variation of this embodiment, the SAS may determine via detection of keywords that the enquiry involves a potential default of an existing student loan, and this may be a further skill that is used to select a further subset from among the pool of agents. Thus, the keywords, as well as the dialed number, may be used to ascertain a skills set. Other information, such as information from the caller's account, could also be used to ascertain a skill set.

Round-Robin

This approach distributes voice messaging service requests to a pool of available agents based on an equitable manner of some sort, which in this case is a round-robin approach. Specifically, in one embodiment, an ordered list of agents are defined and the first voice message is handled by the first agent on the list, the second voice message on the second agent on the list, etc. In one variation, this approach may assign the voice message to the next agent if the first agent is on a call. Once allocated to an agent, when the current work item is completed by the agent, the agent is then presented with the voice message to process. Thus, even an agent currently unavailable may be treated the same as if the agent is available. In another variation, agents on the list who are currently on a call are skipped, and the next agent on the list is examined to see if they are available. In this approach, the voice message is allocated to the next available agent on the list.

The pool of agents could be a list comprising the subset of agents having a certain characteristic or skill set. Thus, a round-robin approach may be applied to a list of agents having a specific qualifications, such as bi-lingual agents. This is but one example of how multiple selection algorithms can be combined.

Other Queuing Approaches

Other approaches for allocating a voice message to an agent are possible. Agents can be selected at random, who are then assigned the voice message if they are currently available, or as their next work item when they complete their current work item. Or, the process could select at random only those agents that are currently available. Another approach would allocate the voice message to the agent who has handled the fewest voice messages in a defined time period, such as during their shift. Another approach would allocate the voice message to the agent who has least recently handled a voice message. Still another approach would involve determining which agent has been idle the longest time, or the longest cumulative time, and award the voice message to be processed by that agent. Other approaches may provide a preference for an agent or agents that have interacted with this particular caller previously. Finally, another approach may ensure that an agent is allocated a voice message to process after a certain number of voice calls. In this case, the belief is that providing a variety of types of work to an agent provides a benefit to the agent, in "mixing up" the work. Those skilled in the art will recognize that various combinations or variations may be created using these and other queueing techniques.

Phase 4—Agent Presentation

The agent presentation phase gathers the information in the AAIR and the agent selected, and presents the information in a GUI to the agent for processing the voice message. The presentation of the information proper may be preceded by a voice message processing notification indication provided to the agent indicating that a voice message is waiting to be processed. This form of agent indication can be useful if the agent is already engaged in a task, and may be already interacting with a graphical user interface for a different application. The notification indication is typically a relatively small sized icon, which is displayed on a computer monitor to inform the agent that a voice message is waiting to be processed. In this case, the message processing notification indication merely serves to inform the agent. However, in other embodiments, the agent may then select the icon, indicating they wish to process the voice message, which causes the full graphical user information screen for processing the voice message to be displayed. If the agent is not presently engaged in a task, then the notification indication could still be provided to the agent, or the full graphical user interface could be automatically presented to the agent.

Agent Selection and Notification Process Flow

Figure 7:
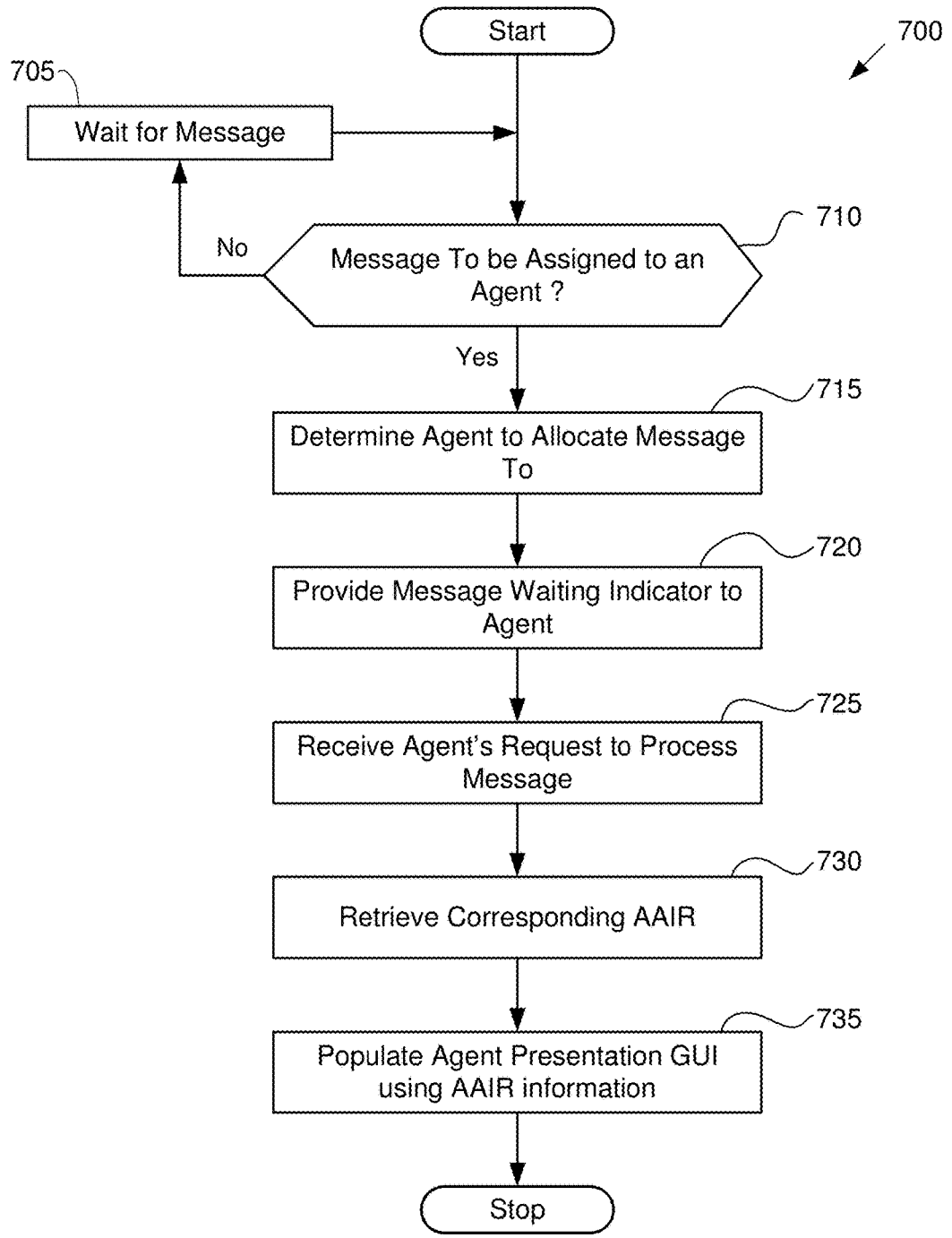
FIG. 7 illustrates one embodiment of a process flow associated with scheduling a voice agent to process a voice message.

The process of determining an agent to handle the message and notification of the agent is shown in FIG. 7. This process combines aspects of selecting an agent (and thus could be categorized as being associated with Phase 3) and then providing notification to the agent and presenting the information to the agent (which are associated with Phase 4). Turning to FIG. 7, the process 700 assumes that one or more AAIRs have been created. That is, there are voice messages left which need to be assigned. Once created, a decision is made in operation 710 whether the AAIR has been assigned to an agent for processing. If there are none or no more to be assigned, then the process loops to operation 705, where the process waits for a message that needs to be assigned to an agent.

If there is a message to be assigned to an agent to process, then the appropriate agent to handle the message is identified in operation 715. The selection of an appropriate agent can use any of the above identified algorithms for determining which agent should handle the message. Once that is determined, then that selected agent is provided with a message waiting indicator in operation 720. As indicated above, the message waiting indicator may be an icon which is displayed on the agent's work screen and informs the agent of an upcoming message for the agent to process. Then, in this embodiment, a request is received from the agent indicating the agent is now ready to process the message in operation 725. This causes the corresponding AAIR to be retrieved in operation 730, (if it hasn't already) where the information in the record is extracted as needed and used in operation 735 to populate an agent message presentation GUI. The agent then interactions with the message presentation GUI as appropriate.

There are a variety of message presentation GUIs that can be defined for agent interaction. The particular format may vary, and various applications may offer different features. However, as will be seen, some aspects are expected to be common, due to their utility in assisting the agent in addressing the voice message.

Phase 4—Agent Presentation

Figure 8:
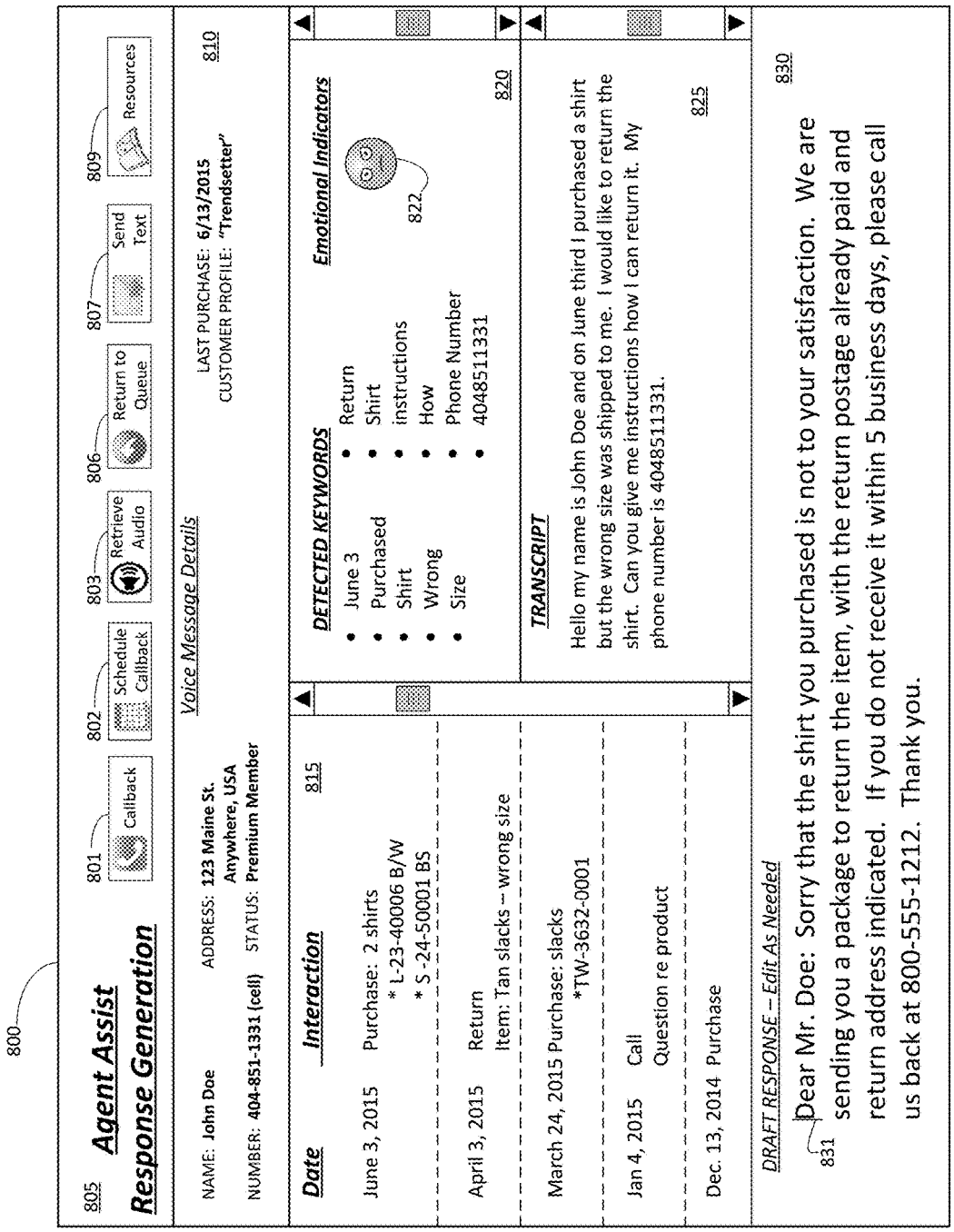
FIG. 8 represents one embodiment of a voice message presentation graphical user interface according to the concepts and technologies disclosed herein.

Turning to FIG. 8, one embodiment of a message presentation GUI 800 is shown. This screen or window 800 has various portions. The first sub-window portion 805 includes information regarding the overall function of the GUI and various function icons 801-809 shown. These function icons may be useful to the agent in processing the message. The first icon shown in the callback icon 801. This function may be invoked by the agent if the agent desires to initiate a voice callback to the caller who left the message. In some instances, addressing the caller's voice message may warrant a personal form of communication in the form of a voice callback, as opposed to leaving a SMS text message or some other form of response.

Figure 9B:
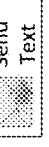
FIGS. 9A-9D represent various graphical user interfaces that may be presented to an agent.
Figure 9D:
Figure 9A:

When this function icon is selected, a pop-up window may be presented to the agent, such as is shown in FIG. 9A. Turning to FIG. 9A, the pop-up window 905 informs the agent that a callback call is to be undertaken to the caller at the telephone number indicated. This telephone number may be a number indicated by the caller, a telephone number based on the calling party telephone number when the voice message was left, or a telephone number associated with an account of the caller. The telephone number can be populated by the system or edited/completed by the agent.

Turning back to FIG. 8, the next function icon shown in the first sub-window portion 805 is the "schedule callback" icon 802. When this function icon is selected, the agent may be presented with the pop-up screen shown in FIG. 9B. In FIG. 9B, the pop-up window 920 prompts the agent to select a date and/or time for scheduling the callback. Various controls may be presented allowing the agent to select the date and adjusting the time. The allowable time/dates may be coordinated with the agent's work schedule, so that the callback may be scheduled only when the agent is scheduled to work. Otherwise, the agent would not be able to complete the callback, and another agent would have to do so. The agent may also be prompted with various 'quick-select' options allowing the agent to schedule the callback for a similar time the following day for the same agent, a different agent, or for when the next available agent is available. This allows the agent to quickly dispose of the callback with minimal interaction of the pop-up screen 920. When the agent is finished with indicating how the callback should occur, the agent can select a "submit" function icon which then initiates the appropriate callback process.

Turning back to FIG. 8, another function icon that may be selected in the "retrieve audio" function 803. This function allows the agent to hear the audio of the original voice message, if so required. More will be said about this function later.

Figure 9C:

The next function icon is the "return to queue" function 806. This returns the message to the message allocation queue so that another agent may handle the voice message. In this case, the agent may invoke this function if they are unable to currently process the message. Thus, this can be viewed as a form of agent rejection in being assigned the task. If this function is invoked, the agent may be presented with a pop-up window as shown in FIG. 9C. In FIG. 9C, the pop-up window 940 may inform the agent that the voice message will be processed by another agent. There may be an option for the agent to indicate that they are willing to process the voice message at a later time. This may be useful if the agent is willing to process the voice message, but cannot at the moment for unforeseen circumstances. Thus, the agent can defer handling of the voice message. A "Done" function can be provided for the agent to close out this window.

Turning back to FIG. 8, the next function shown to the agent is the "send text" icon 807. This function icon causes the text presently shown in the message presentation GUI 800 to be sent as an SMS text. If the agent invokes this function, then the agent may be presented with a pop-up window as shown in FIG. 9D. This window 960 merely confirms that the agent desires to send the text to the caller. In other embodiments, the window may allow the agent to select other forms in which to send the text. That is, the text could be sent as a fax, email, instant message instead of an SMS text.

The sending of an SMS text is only possible if the destination telephone number is a wireless number. Thus, when the caller leaves a number, or a number is otherwise determined for that caller based on the message left, a check may be performed by the system to determine if that calling number is a wireless number, and thus capable of receiving a SMS text message. If so, then the option to generate and send a SMS text may be provided to the agent. If the number is a wireline number, which is incapable of receiving a SMS text, certain function icons and other related information may be 'grayed-out' to the agent, so that it is not possible for the agent to attempt to send a SMS text to the caller.

Turning back to FIG. 8, another function icon that may be presented to the agent is the "resources" icon 809. This function icon allows the agent to retrieve and/or view various resources which may be useful in responding to the voice message. More will be discussed about this function icon below.

Typically, the function icons 801-809 are used only after the agent has reviewed other portions of the screen 800 to some extent. The first portion that is typically reviewed by the agent is the voice message details section 810. This section contains information related to the caller and the voice message itself. In this embodiment, information such as the caller's name, address, and the telephone number used to make the voice message call are indicated, along with an indication that the telephone number is a wireless number. Thus, because the number is a wireless number, the agent (and the system) knows that a SMS text response may be sent to the caller. Other information in this section 810 may include account-related information, such as the customer's status, when their last purchase was made, what it comprised, an indication of their profile, etc.

Such additional information may be tailored to the particular application. For example, if the caller called a customer service number, information regarding the customer's account may be provided to the agent. If the customer is calling to enquire about a bill, then information about the customer's billing records may be provided, and so forth. The intent is to provide information to the agent that is expected to be pertinent to the caller and useful to the agent when responding to the caller's enquiry.

The next section shown in this embodiment is the caller interaction summary section 815. This portion provides information about prior interactions of the caller, which may include when item were purchased, when enquires were received, when returns were initiated, etc. This allows the agent servicing the message to quickly ascertain what prior transactions the caller has been engaged in. In this example, because the caller is desiring to exchange a recent item purchased, the agent can view the recent purchase history. In various embodiments, some of the information in the caller interaction summary section 815 could be included in the voice message details section 810, or vice versa. The decision may rest upon how much information needs to be presented and the available display space that the agent views.

The next section is the keyword section 820. This section displays the various keywords and/or topics detected by in the voice message left by the caller. The indication of the keywords may include all or a subset of the keywords detected. Although reference is made to "keywords," the display could show the topics. In this embodiment, various keywords are reported in sequence in processing the voice message. Hence, it will be observed that the keyword "shirt" is reported twice, reflecting that it was detected twice. Further, the indication of the keywords may also reflect the temporal order in which they were detected in the voice message. In other embodiments, an alphabetical listing of the keywords/topics could be indication, or a time of occurrence could be reported along with each keyword. Other forms of presentation may include a timeline, where the keywords are positioned in conjunction with the timeline in a relative order as to when each keyword was detected during the voice call.

The keyword section 820 may also include an emotional indicator 822. This may be a graphical indication of an emotional aspect of the voice message, which may processed as described in Processing Stored Voice Messages to Identify Non-Semantic Message Characteristics, U.S. patent application Ser. No. 14/219,171, filed on Mar. 19, 2014, the contents of which are incorporated by reference. That application discloses how speech can be processed to ascertain various emotions of the speaker, such as whether the speaker is e.g., angry, sad, happy, etc. It may be useful for the agent to know, for example, that the caller was angry or upset when they left their message. This information, coupled with the transcript and/or the keyword detected, can provide useful textual information in responding to the caller. Further, a series of emoticons can be used to depict observed emotions during the message by the speech analytics engine. Again, these emoticons may be displayed in conjunction with a timeline where their position reflects a temporal relationship as to when that emotion was detected during the voice message. In many applications, knowing that the caller is angry or upset may be a condition that is particularly important to detect and inform the agent thereof.

The next section is the transcript section 825 that includes a transcript of the voice message. The quality of the transcription may vary based on the speech analytics technology used. For example, even though the speech analytics technology may accurately recognize words, it may not be able to properly punctuate or structure sentences. However, the purpose of the transcription section is to inform the agent of the voice message, and the agent may use this to confirm or clarify the scope of the message based on the detected keywords. Or, the agent may simply read this section first, and use the keyword section to clarify or confirm their understanding. Thus, it may not be necessary to accomplish this purpose to have a completely accurate and grammatically correct transcript. There may be words which cannot be recognized or understood by the speech analytics system, and so the transcript may present tokens or placeholders for words that are unrecognized. Appropriate controls for scrolling may be provided to the agent in this section (as well as other sections) for viewing the complete transcription.

The next section shown is the response section 830. In this embodiment, the response is a draft response presented as a draft SMS text message. The cursor 831 is positioned at the beginning of the message response to facilitate the agent editing the contents. The draft response is prepared based on analyzing the detected keywords and using various rules for selecting a response template, where certain information may be incorporated to customize the template. For example, in this embodiment, the name of the caller is populated from information derived either from the voice message or the name of the account holder using the telephone number to identify the account. Further, the item to be returned ("shirt") may be determined or populated from the keywords detected or derived from a date when the caller's order was recorded. The remainder of the draft response may be "stock text" which applies to any items to be returned.

Thus, in this embodiment, the agent merely has to review the transcript and confirm that the draft response is appropriate. This saves the agent from having to type and check the response. Further, the use of a pre-populated template ensures that certain information is not mistyped, such as the toll free telephone number, and that certain information is included, such as the "Thank you" closing. If the agent needs to further edit the draft message so as to produce the final response message, they can do so by moving the cursor to the appropriate section and editing the text accordingly. Once the agent is satisfied with the text, the agent can then invoke the "send text" function icon 807, which will cause the text to be sent to the caller as an SMS text. Further, a record of the transaction is created, so that if another voice message is left by the same individual, the interaction section 815 would reflect that this text was sent.

Phase 5—Agent Interaction

The agent interaction phase refers to interactions that the agent may have with the message presentation GUI. Some of the actions mentioned above could be categorized as part of the agent interaction phase. For example, in some instances, the agent may determine that the draft response may not be an appropriate response. That is, the agent may determine that there is a deficiency in the processing of the speech with respect to identifying keywords, the development of the transcript, and/or the development of the draft response. The agent may choose to listen to the original audio of the voice message in order to properly ascertain the message or a particular nuance of the voice message. This can be accomplished by the agent invoking the retrieve audio function icon 803. Once the retrieve audio icon is selected, the pop-up window shown in FIG. 10 may appear.

Figure 10:
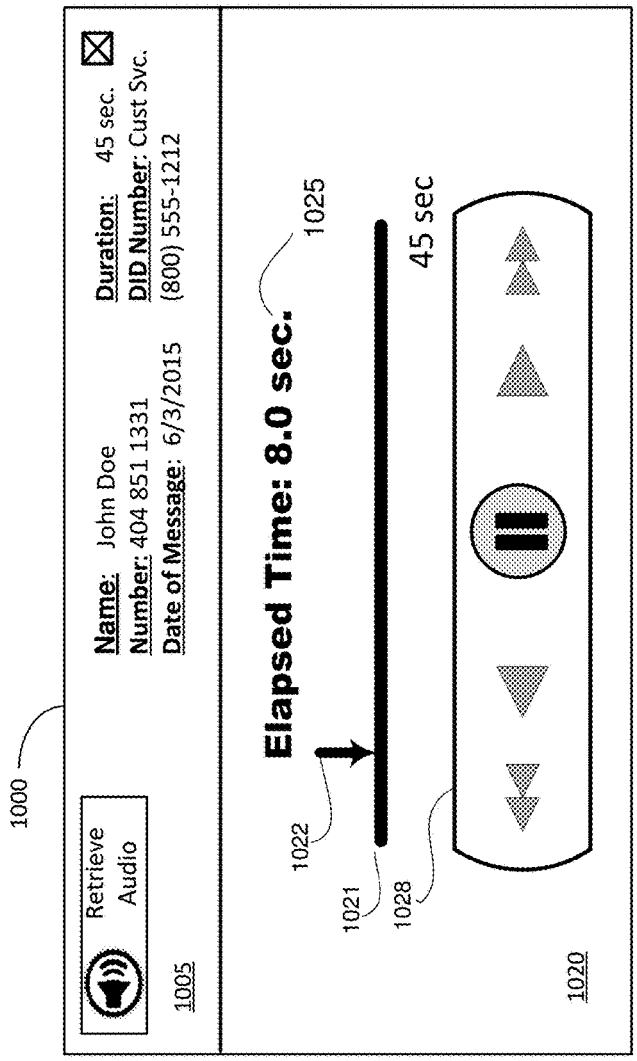
FIG. 10 represents one embodiment of an audio player graphical user interface that may be presented to an agent.

Turning to FIG. 10, an audio player window 1000 is presented which can be used so that the agent may hear the audio of the voice message. The audio player window includes an information summary section 1005 that includes high level information about the voice message, which may include replicating the name and number of the caller, along with when the message was left, its duration, and the toll free number (e.g., "DID Number") that was originally called.

The audio player window 1000 in this embodiment includes an audio control section 1020 which allows the agent to control the playback of the audio message. In this embodiment, a timeline 1021 represents the duration of the message with a marker 1022 showing where the audio is currently playing. An elapsed timer 1025 indicates precisely where in the message the current audio is playing. Although not shown, the detection of various keywords could be shown along the timeline in a temporal order corresponding to when they were detected. Similarly, emoticons could also be shown in a temporal order corresponding to various emotions that were detected in the voice message.

Finally, various control functions 1028 are provided for the agent to pause, play, fast forward, reverse, etc. the audio of the voice message. The audio player window 1000 allows the agent to hear, replay, and confirm the message contents. This may be useful in situations where the speech analytics system has difficulties in providing an accurate transcription. This may occur if there is background audio noise, the caller has an accent, there is poor audio quality, etc. Thus, the agent may be able to understand the message contents even when the speech analytics system is unable.

Returning to FIG. 8, it is possible that after the agent has reviewed the transcript and/or the audio of the voice message, the agent may have additional questions regarding the response. That is, the agent may determine that the draft response is inappropriate, insufficient, or may otherwise not know whether it is correct. The agent may have additional questions as to how to best address the customer's enquiry. Specifically, the agent may not have sufficient information to know how to best edit the draft response, and the agent may require reviewing various internal resources to craft an appropriate answer.

Figure 11:
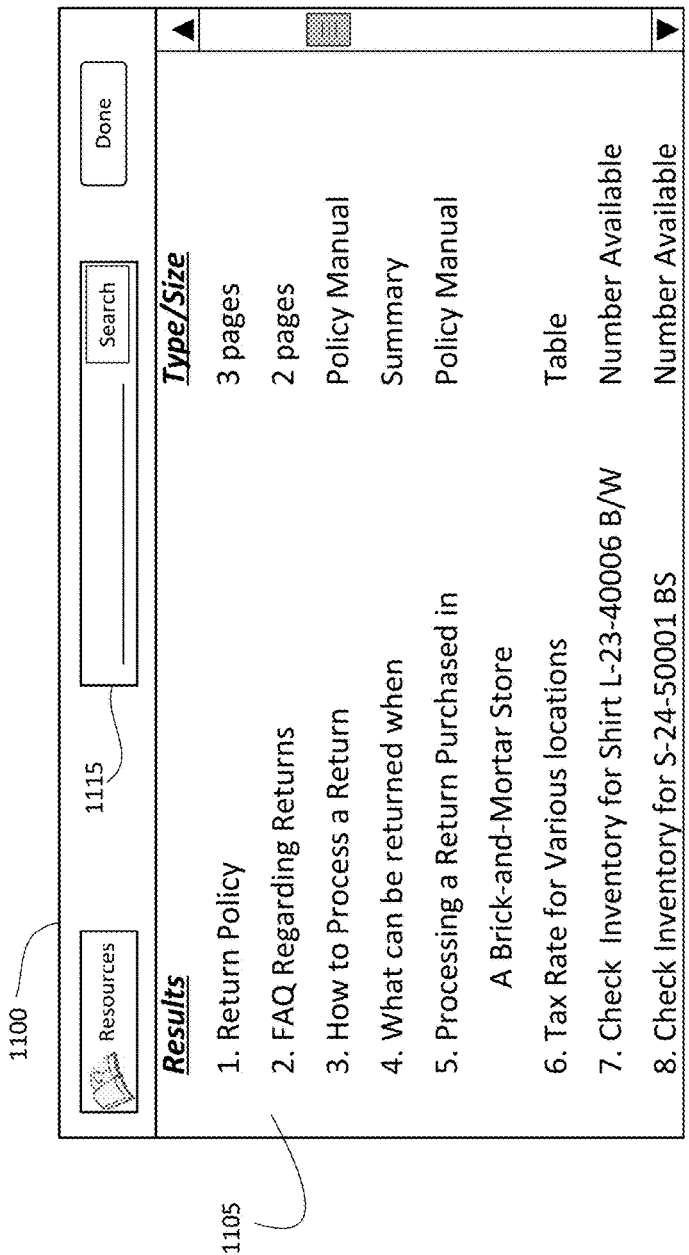
FIG. 11 represents one embodiment of list of resources identified by keywords that may be presented to an agent.

In this case, the agent may select the resources functional icon 809. Doing so requests the system identify various resources that may be applicable to the agent in responding to the enquiry. After invoking this function, the agent may be presented with a pop-up window as shown in FIG. 11. Turning to FIG. 11, the pop-up window 1100 represents one embodiment of how applicable resources may be presented to the agent. In this embodiment, the result section 1105 shows a listing of documents, resources, web sites, etc. that may be relevant to a search performed using the keywords detected from the voice message. In addition, information about the resource itself (e.g., the type of document or the size of the file) may be provided to the agent. Thus, in this example, the agent sees various internal documents related to processing a return item previously ordered. This includes a summary of the return policy, frequently asked questions about returns, instructions for processing a return, etc. The agent can select one of the resources, and may be able to double click on it to open the corresponding resource. Thus, the agent may be able to verify how to process a return, whether the item to be exchanged is currently available in stock, etc.

The results returned are based on using the detected keywords/topics in the voice message to ascertain relevant search results. However, as with many search technologies, the search algorithm may return results that are not relevant. Thus a text box 1115 is provided so that the agent can type in relevant or additional search terms and re-run the search. This allows the agent to perform a search and research a particular question/issue that may not be readily pertinent based on the keywords detected by the speech analytics system.

Phase 6—Response Generation

Returning to FIG. 8, after the agent has reviewed the information presented to the agent, and has potentially interacted with user interface by reviewing the audio message itself and/or after the agent may have accessed various resources, the agent may then confirm and/or edit the draft response and invoke the send text function icon 807 to send the text to the caller. The text message is sent, and the interaction history is updated. Thus, if the caller leaves another voice message, the next agent will see in the interaction history section information related to the current enquiry and response.

Other Embodiments

As evident, once the agent is presented with the GUI shown in FIG. 8, the distinction of the agent reviewing information (in Phase 4) versus interacting with the system (in Phase 5), and generating a response (in Phase 6), is somewhat of an artificial distinction, but is described in this manner to facilitate illustration of the embodiments herein.

In each of the phases, a variety of options could be presented and implemented without departing from the principle herein. For example, in the information presentation phase shown in FIG. 8, a search for relevant resources (similar to that shown in FIG. 11) could have been performed and the results shown to the agent, in lieu of, or in addition to, the interaction section 815. The detected keywords section 820 could show the topic in lieu of the keyword, and indicate the relative time into the voice message that it was detected. The agent could select a keyword causing the audio player window to appear and the audio automatically playing at that selected keyword.

The transcript portion 825 could be augmented to show a periodic emoticon every word, few seconds, or when a change in emotion is detected. This would allow the agent to detect when in a particular message the caller was angry relative to other portions of the message. Further, the draft response could show which words are populated in the draft response as a result of the detected keywords. Thus, in the example shown, the draft response may be a standard response, except for the inclusion of the words "Mr. Doe" and "shirt." These words could be shown in bold font or another color, and allows the agent to readily identify what portions of the text are custom generated by the keywords detected.

In another embodiment, the draft response text could present the text of a corresponding audio recording to be played to the caller upon a callback. This would be useful if the caller has a wireline number, and is thus unable to receive an SMS text as a response. Alternatively, the agent could even type or edit text that is provided to a text-to-speech ("TTS") module so that a voice callback could occur with the system generating a TTS announcement to the caller. There could be an additional function icon displayed which indicates whether the text in the draft response should be sent as a SMS text or sent as a voice call, with the TTS announcement playing. If the calling number is a wireline number, then playing the TTS announcement may be required. However, if the calling number is a wireless number, then either playing a TTS announcement or sending an SMS text may be possible, and the agent could select which form should be used.

Alternatively, the draft response could contain text which the agent should read to the caller upon initiating a callback to provide a response to the caller. In another variation, the agent could record their speech corresponding to the text displayed, which is then recorded and used as a pre-recorded announcement to be played by the system upon callback to the caller.

Thus, it is apparent that the system could provide the response as a voice call, SMS text call, as well as other forms. Specifically, the text in the draft response could be sent as an email, fax, or postal letter, assuming the appropriate address information for each form is maintained.

In another embodiment, the system could detect if it is inappropriate to send a text to the caller under certain circumstances. For example, if an automated text response is sent to a caller in response to a first enquiry, and the caller is not satisfied with the response, the caller may call and leave a second enquiry, but wherein the response reflects a high level of anger. This emotional aspect could be detected by the system, and the presence of a specific emoticon reflecting anger or frustration may trigger in the second enquiry may indicate to the system to prevent another text response, and instead the system may require the agent to respond with a voice call back. This ensures that a customer that is unhappy with a text response and is not subjected to another text response. Or, if the speech analytics system detects certain keywords in the voice message reflecting that the caller did not receive a useful text response, then the system could then require that the agent initiate a voice callback to the caller instead of sending a text response.

Thus, the determination of whether a second automated text response is appropriate may be determine based on either semantic content (words present in the voice message) or non-semantic content (emotion detected in the voice message).

Exemplary Processing Device Architecture

Figure 12:
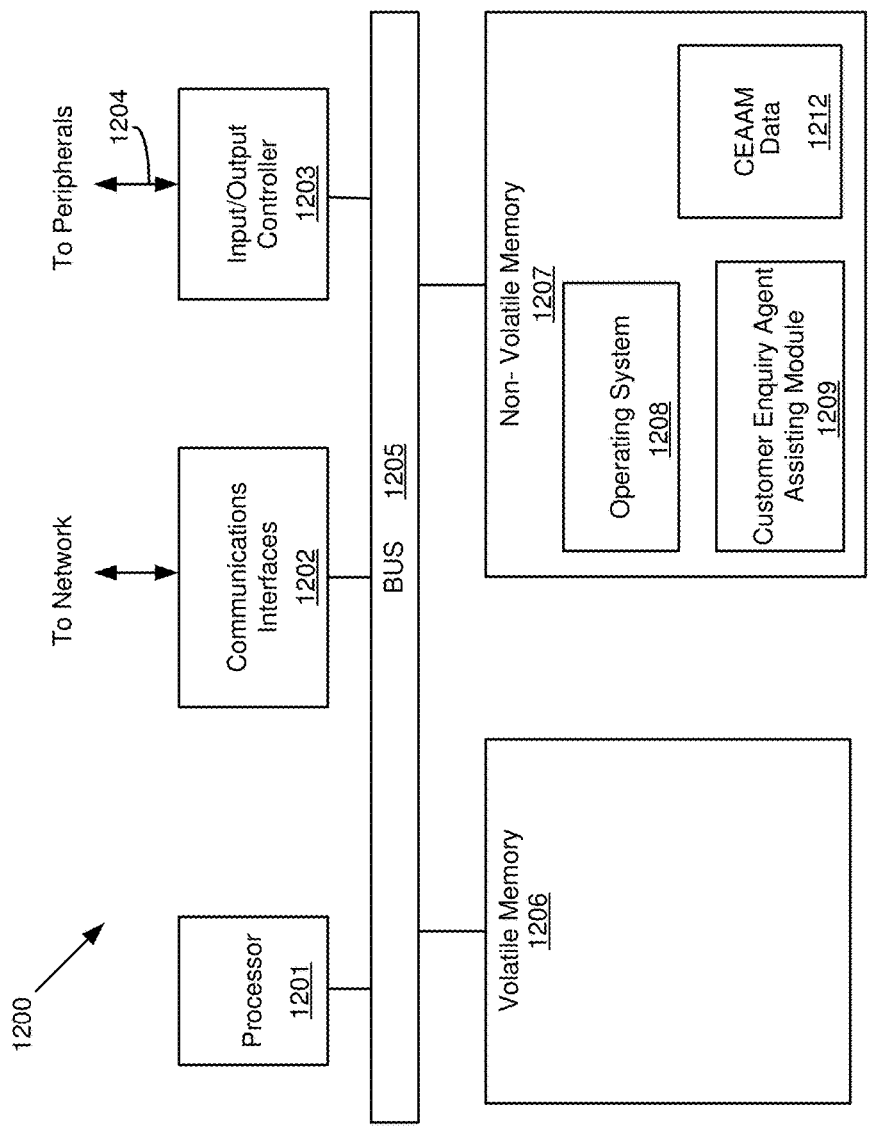
FIG. 12 represents one embodiment of a processing system that may be used to practice the concepts and technologies disclosed herein.

FIG. 12 is an exemplary schematic diagram of a processing system 1200 that may be used in an embodiment to practice the technologies disclosed herein, such as the call handler 210, caller enquiry agent assisting module 280, or speech analytics system 220. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein, including those entities executing software.

As shown in FIG. 12, the processing system 1200 may include one or more processors 1201 that may communicate with other elements within the processing system 1200 via a bus 1205. The processor 1201 may be implemented as one or more complex programmable logic devices ("CPLD"), conventional microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, integrated circuit processors, other circuitry, or the like.

In one embodiment, the processing system 1200 may also include one or more communications interfaces 1202 for communicating data via the local network with various external devices, including those shown in FIG. 2. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1203 may also communicate with one or more input devices or peripherals using an interface 1204, such as, but not limited to: a keyboard, a mouse, a touch screen/display input, microphone, pointing device, etc. The input/output controller 1203 may also communicate with output devices or peripherals, such as displays, printers, speakers, headsets, banner displays, etc.

The processor 1201 may be configured to execute instructions stored in volatile memory 1206, non-volatile memory 1207, or other forms of non-transitory computer-readable storage media accessible to the processor 1201. The volatile memory 1206 may comprise various types of memory technologies, including, but not limited to: random access memory ("RAM"), dynamic random access memory ("DRAM"), static random access memory ("SRAM"), and other forms well known to those skilled in the art. The non-volatile memory 1207 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1207 may store program code and data, which also may be loaded into the volatile memory 1206 at execution time. Specifically, the non-volatile memory 1207 may store one or more computer program modules, such as a CEAAM 1209 containing instructions for performing the process and/or functions associated with the technologies disclosed herein, and related CEAAM data 1212 such as keyword sets, and/or operating system code 1208. In addition, the CEAAM 1209 may generate or access the CEAAM data 1212 in the non-volatile memory 1207, as well as in the volatile memory 1206. The volatile memory 1206 and/or non-volatile memory 1207 may be used to store other information including, but not limited to: records, applications, programs, scripts, source code, object code, byte code, compiled code, interpreted code, machine code, executable instructions, or the like. The volatile memory 1206 may include keyword sets, action sets, and other related data to implement the concepts and technologies disclosed herein. These instructions may be executed or processed by, for example, the processor 1201. These may form a part of, or may interact with, the CEAAM 1209 and/or CEAAM data 1212.

The technologies described herein may be implemented in various ways, including as computer program products comprising memory storing instructions causing a processor to perform the operations associated with the above technologies. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

The computer program product comprises a tangible, non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such tangible, non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for responding to an enquiry from a caller, comprising:
   a call handler configured to:
      receive a voice call from the caller, wherein the voice call originates from a wireless device,
      answer the voice call,
      place the voice call in a hold queue,
      play a first announcement to the caller indicating the voice call is in the hold queue,
      ascertain the voice call originated from a wireless telephone number,
      in response to ascertaining the voice call originated from the wireless telephone number, play a second announcement to the caller requesting a voice message be left by the caller in order to subsequently receive a response comprising a short message service ("SMS") text message, and
      receive the voice message;
   a speech analytics subsystem configured to:
      process the voice message to generate a transcript of the voice message; and
   a caller enquiry agent assisting module configured to:
      select an agent of a contact center to receive information about the voice message,
      present the transcript on a display of a computer used by the agent selected to receive the information about the voice message,
      display an icon to the agent on the display of the computer for playing audio of the voice message,
      receive a selection of the icon from the computer for playing the audio of the voice message,
      in response to receiving the selection of the icon, cause the audio of the voice message to be played to the agent,
      receive input from the computer after the audio of the voice message is played to the agent, wherein the input is used to produce the SMS text message,
      receive a command from the computer in response to the agent requesting to send the SMS text message to the caller as the response, and
      cause the SMS text message to be sent to the wireless telephone number.

2. The system of claim 1, wherein the caller enquiry agent assisting module is further configured to:
   generate a draft SMS text message; and
   present the draft SMS text message to the agent on the display, wherein the input from the agent used to generate the SMS text message comprises editing the draft SMS text message.

3. The system of claim 1, wherein the caller enquiry agent assisting module is further configured to:
   receive one or more keywords detected by the speech analytics subsystem in the voice message;
   use the one or more keywords as search terms to identify a plurality of resources; and
   present a plurality of links corresponding to the plurality of resources on the display to the agent.

4. The system of claim 1, wherein the caller enquiry agent assisting module is further configured to:
   receive one or more keywords detected by the speech analytics subsystem in the voice message; and present the one or more keywords on the display to the agent.

5. The system of claim 3, wherein the caller enquiry agent assisting module is further configured to:
receive a selection input from the computer used by the agent to select one of the plurality of links; and
displaying one of the plurality of resources corresponding to the selected one of the plurality of links on the display to the agent.

6. The system of claim 1, wherein the caller enquiry agent assisting module is further configured to:
receive account information associated with an account associated with the wireless telephone number; and
present at least a subset of the account information on the display of a computer used by the agent selected to receive the information about the voice message.

7. A non-transitory computer readable medium storing instructions that when executed by a processor cause the processor to:
receive a voice call from a caller, wherein the voice call originates from a wireless device;
place the voice call in a hold queue,
play a first announcement to the caller indicating the voice call is in the hold queue;
ascertain the voice call originated from a wireless telephone number;
in response to ascertaining the voice call originated from the wireless telephone number, play a second announcement to the caller requesting a voice message be left by the caller in order to subsequently receive a response comprising a short message service ("SMS") text message;
receive the voice message;
receive a transcript from a speech analytics system generated from the speech analytics system processing the voice message left by a caller after originating the voice call to a contact center;
select an agent from a plurality of agents of the contact center to receive the transcript;
transmit the transcript for display on a monitor of a computer used by the agent;
retrieve account information of an account associated with the wireless telephone number used by the caller;
transmit the account information for display on a monitor of a computer used by the agent;
display an icon to the agent for playing audio of the voice message;
receive a selection of the icon from the agent for playing the audio of the voice message;
in response to receiving the selection of the icon, play the audio of the voice message to the agent, wherein the audio is played prior to receiving an input from the agent used to generate the SMS text message;
receive the input received from the computer used by the agent providing text to be sent in the SMS text message to the wireless telephone number; and
process a command received from the computer used by the agent to cause the SMS text message to be sent to the wireless telephone number.

8. The non-transitory computer readable medium of claim 7 storing further instructions that when executed by the processor cause the processor to:
generate a draft SMS text message; and
transmit the draft SMS text message for display on the monitor of the computer used by the agent, wherein the input from the agent providing the text message comprises editing the draft SMS text message.

9. The non-transitory computer readable medium of claim 7 storing further instructions that when executed by the processor cause the processor to:
process one or more keywords received from the speech analytics system derived from processing the voice message; and
display the one or more keywords on the monitor of the computer.

10. The non-transitory computer readable medium of claim 7 storing further instructions that when executed by the processor cause the processor to:
process one or more keywords received from the speech analytics system derived from processing the voice message;
use the one or more keywords to search a knowledge base to identify one or more resources; and
transmit one or more links corresponding to the one or more resources for display on the monitor of the computer.

11. A non-transitory computer readable medium storing instructions that when executed by a processor cause the processor to:
receive a voice call from a caller, wherein the voice call originates from a wireless device;
answer the voice call,
place the voice call in a hold queue,
play a first announcement to the caller indicating the call is in the hold queue;
ascertain the voice call originated from a wireless telephone number;
in response to ascertaining the voice call originated from the wireless telephone number, play a second announcement to the caller requesting a voice message be left by the caller in order to subsequently receive a response comprising a short message service ("SMS") text message;
receive the voice message;
receive a transcript from a speech analytics system generated from processing the voice message left by the caller after originating the voice call to a contact center;
select an agent from a plurality of agents of the contact center to receive the transcript;
transmit the transcript for display on a monitor of a computer used by the agent;
retrieve account information of an account associated with the wireless telephone number used by the caller;
transmit the account information for display on a monitor of a computer used by the agent; and
display an icon on the monitor to the agent for playing audio of the voice message;
receive a selection of the icon from the agent for playing the audio of the voice message;
in response to receiving the selection of the icon, play the audio of the voice message to the agent;
process a command received from the computer used by the agent indicating to re-queue the voice message.

12. The non-transitory computer readable medium of claim 11, storing further instructions that when executed by a processor to:
select another agent from the plurality of agents of the contact center to receive the transcript;
transmit the transcript for display on another monitor of another computer used by the another agent;
retrieve the account information of the account associated with the wireless telephone number used by the caller;
transmit the account information for display on the another monitor of the another agent;

receive a second input from the another agent generating another SMS text message to be sent to the wireless telephone number; and receive a second command from the another agent to send the another SMS text message to the wireless telephone number.

13. A method for assisting an agent in a contact center in responding to an enquiry of a caller comprising:

receiving an incoming voice call from the caller at the contact center;

answering the incoming voice call by an interactive voice response unit ("IVR") of the contact center;

place the voice call in a hold queue, playing a first announcement to the caller indicating the incoming voice call is in the hold queue, ascertaining the incoming voice call originated from a wireless telephone number, in response to ascertaining the incoming voice call originated from the wireless telephone number, playing a second announcement to the caller requesting a voice message be left by the caller in expectation of receiving a subsequent communication comprising a short message service ("SMS") text message responding to the voice message;

receiving the voice message from the caller;

storing the voice message in a memory store;

processing the voice message from the caller to identify one or more keywords in speech from the caller;

determining an agent is available to provide the subsequent communication to the caller;

presenting the agent with information related to the voice message including a transcript of the voice message;

displaying an icon to the agent for playing audio of the voice message;

receiving a selection of the icon from the agent for playing the audio of the voice message;

in response to receiving the selection of the icon, playing the audio of the voice message to the agent;

and presenting information on a monitor of a computer used by the agent, wherein the information relates to the subsequent communication to be conveyed to the caller.

14. The method of claim 13, wherein the information related to the voice message comprises a draft SMS text message, and the method further comprises:

receiving an input from the agent editing the draft SMS text message thereby generating a final SMS text message; and sending the final SMS text message as the subsequent communication to a wireless number associated with the voice call from the caller.

15. The method of claim 14, further comprising:

receiving a command from the computer used by the agent to send the final SMS text message as the subsequent communication to the caller.

16. The method of claim 13, further comprising:

receiving a command from the computer used by the agent to initiate the subsequent communication as an outbound voice call to the caller.

17. The method of claim 13, further comprising:

receiving a command from the computer used by the agent to review audio of the voice message.

18. The method of claim 13, further comprising:

receiving a command from the computer used by the agent to review a resource associated with one or more keywords derived by a speech analytics system processing the voice message.

\* \* \* \* \*